(12) United States Patent
Matsuda

(10) Patent No.: US 12,294,682 B2
(45) Date of Patent: May 6, 2025

(54) IMAGE PROCESSING APPARATUS AND METHOD OF CONTROLLING IMAGE PROCESSING APPARATUS FOR RESTRICTING OPERATION TO NOTIFICATION INFORMATION

(71) Applicant: SHARP KABUSHIKI KAISHA, Sakai (JP)

(72) Inventor: Chikara Matsuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/200,600

(22) Filed: May 23, 2023

(65) Prior Publication Data
US 2023/0388431 A1  Nov. 30, 2023

(30) Foreign Application Priority Data
May 30, 2022 (JP) ................... 2022-087956

(51) Int. Cl.
*H04N 1/00* (2006.01)
(52) U.S. Cl.
CPC ..... *H04N 1/00925* (2013.01); *H04N 1/00824* (2013.01); *H04N 1/00854* (2013.01); *H04N 1/0088* (2013.01)
(58) Field of Classification Search
CPC .......... H04N 1/00925; H04N 1/00824; H04N 1/00854; H04N 1/0088
See application file for complete search history.

(56) References Cited

U.S. PATENT DOCUMENTS

| | | | | |
|---|---|---|---|---|
| 2004/0117401 A1* | 6/2004 | Miyata | ............... | G06F 21/564 |
| 2011/0296008 A1* | 12/2011 | Kamata | ............... | H04L 67/51 |
| | | | | 709/224 |
| 2012/0066294 A1* | 3/2012 | Mizuno | ............ | H04N 1/00435 |
| | | | | 709/203 |
| 2014/0279570 A1* | 9/2014 | Yoshida | ............... | G06Q 10/20 |
| | | | | 705/305 |
| 2018/0316674 A1* | 11/2018 | Shaked | ............... | H04L 63/10 |
| 2019/0278540 A1* | 9/2019 | Onitsuka | ............ | H04N 1/00076 |
| 2019/0373129 A1* | 12/2019 | Kawaguchi | .......... | G06F 21/554 |

FOREIGN PATENT DOCUMENTS

JP   2004-259060 A   9/2004

* cited by examiner

*Primary Examiner* — Nicholas Pachol
(74) *Attorney, Agent, or Firm* — ScienBiziP, P.C.

(57) ABSTRACT

An image processing apparatus according to an embodiment includes: a detector which detects an occurrence of an event; a display which displays notification information regarding the occurred event; and a controller which restricts operation authority over the notification information displayed on the display to a specific user when the notification information corresponds to a notification for the specific user, and makes the operation authority over the notification information displayed on the display unrestricted when the notification information does not correspond to a notification for the specific user.

7 Claims, 22 Drawing Sheets

FIG. 3A

| NOTIFICATION ID | EVENT | MESSAGE FILE | ADMINISTRATOR NOTIFICATION | NOTIFICATION INFORMATION FILE | AUTHENTICATION | STORAGE LOCATION |
|---|---|---|---|---|---|---|
| #001 | VIRUS INFECTION | ma01-1.txt | Yes | ma01-2.txt | Yes | \\\\MFP\Shared\matext |
| #002 | VIRUS INFECTION | mn01-1.txt | No | mn01-2.txt | No | \\\\MFP\Shared\mntext |
| #003 | MACHINE TROUBLE | ma02-1.txt | Yes | ma02-2.txt | Yes | \\\\MFP\Shared\matext |
| #004 | MACHINE TROUBLE | mn02-1.txt | No | mn02-2.txt | No | \\\\MFP\Shared\mntext |
| #005 | NETWORK TROUBLE | ma03-1.txt | Yes | ma03-3.txt | Yes | \\\\MFP\Shared\matext |
| #006 | NETWORK TROUBLE | mn03-1.txt | No | mn03-4.txt | No | \\\\MFP\Shared\mntext |
| ... | ... | ... | ... | ... | ... | ... |

FIG. 3B

| USER ID | USER NAME | PASSWORD | GROUP | E-MAIL ADDRESS |
|---|---|---|---|---|
| 000111222 | yamada ichiro | ***** | ADMINISTRATOR | yamada_ichiro@sample.com |
| 333444555 | tanaka jiro | ***** | GENERAL | tanaka_jiro@sample.com |

IMAGE PROCESSING APPARATUS AND METHOD OF CONTROLLING IMAGE PROCESSING APPARATUS FOR RESTRICTING OPERATION TO NOTIFICATION INFORMATION

BACKGROUND OF THE INVENTION

Field of the Invention

The present disclosure relates to, for example, an image processing apparatus.

Description of the Background Art

As one of use modes of an image processing apparatus, a mode that is known is to distinguish the users who operate the image processing apparatus between an administrator user (hereinafter simply referred to as an administrator) and a general user. In accordance with multifunctionalization for devices in recent years, opportunities in which users are required of specialized knowledge about network environment and device-specific performance are increasing. Thus, to ensure that all users, including general users, can operate an image processing apparatus constantly, an administrator who manages the operation condition of the device may be provided.

Administrators are given operation authority greater than that of general users in various situations, such as device maintenance, user management, and network management, so that they can deal with an event or an error which has occurred in the image processing apparatus, and information regarding the device handled by the administrator is usually different from that of general users.

Incidentally, a function that is available is to execute virus quarantine on data handled by the image processing apparatus and to notify, when a virus has been detected, the user of the detection of the virus. When a virus is detected, immediate actions, such as confirmation of the infection status and deletion or isolation of the infected data, are required. In most cases, the administrator is responsible for taking these actions.

For example, it is known from the conventional technology that if a virus is detected in the received data, an administrator of an image forming apparatus is notified of the detection of the virus, and the administrator is prompted to take a subsequent action.

When an event such as detection of a virus occurs in an image processing apparatus, preferably, the administrator should be certainly notified of the details of the event and the like via a display device, etc. However, in the conventional technology, no consideration has been made to authority (hereinafter may be referred to as "operation authority") for operating notification information, which is to be displayed by the image processing apparatus in response to detection of an event.

In other words, in the conventional technology, since both the administrator and the general user can operate the displayed notification information, there is a possibility that the general user may delete notification information, which is of a kind that should essentially be checked and acted upon by the administrator, after the general user checks the notification information. For this reason, there is a fear that the notification information may not be certainly notified to the administrator.

An object of the present disclosure is to provide an image processing apparatus and the like which can certainly notify an administrator of notification information which should be checked and acted upon by the administrator.

SUMMARY OF THE INVENTION

In order to solve the above problem, an image processing apparatus according to the present disclosure is characterized by including: a detector which detects an occurrence of an event; a display which displays notification information regarding the occurred event; and a controller which restricts operation authority over the notification information displayed on the display to a specific user when the notification information corresponds to a notification for the specific user, and makes the operation authority over the notification information displayed on the display unrestricted when the notification information does not correspond to a notification for the specific user.

Further, a method of controlling an image processing apparatus according to the present disclosure is characterized by including: detecting an occurrence of an event; displaying notification information regarding the occurred event on a display; restricting, when the notification information corresponds to a notification for a specific user, operation authority over the notification information displayed on the display to the specific user; and making, when the notification information does not correspond to a notification for the specific user, the operation authority over the notification information displayed on the display unrestricted.

According to the present disclosure, it is possible to provide an image processing apparatus and the like which can certainly notify an administrator of notification information which should be checked and acted upon by the administrator.

BRIEF DESCRIPTION OF THE DRAWINGS

FIG. 3A is a diagram illustrating a notification information management table. FIG. 3B is a diagram illustrating a user information management table.

DESCRIPTION OF THE PREFERRED EMBODIMENTS

Embodiments of the present disclosure will be described below with reference to the accompanying drawings. In the present disclosure, a multifunction peripheral capable of performing jobs related to, for example, copying, faxing, scanning, e-mail transmission, and the like, in a single housing is described as a form of an image processing apparatus according to the present disclosure. Note that the embodiments below are presented as examples for describing the present disclosure, and the technical scope of the description as recited in the appended claims is not limited by the following description.

1 First Embodiment

A first embodiment represents a form of a multifunction peripheral provided with: a detector which detects an occurrence of an event; a display which displays notification information regarding the occurred event; and a controller which restricts, when the notification information corresponds to a notification for an administrator as a specific user, operation authority over the notification information displayed on the display to the administrator, and makes, when the notification information does not correspond to a notification for the administrator, the operation authority over the notification information displayed on the display unrestricted. In the first embodiment, a description is given on a mode in which the event corresponds to detection of a virus infecting device information that can be operated only by the administrator or the event corresponds to detection of a virus infecting input/output information for a multifunction peripheral.

Here, the device information that can be operated only by the administrator refers to data for which the operation authority is restricted to the administrator. For example, firmware data of the multifunction peripheral, embedded program data, and the like, correspond to the device information. Further, the input/output information for the multifunction peripheral refers to data for which the operation authority is not restricted and which can be operated by any user irrespective of whether he/she is the administrator or a general user. For example, data related to execution of a job, address book data, data which has been generated by execution of a job and is saved in the multifunction peripheral for reuse as save data, and data saved in, for example, a storage device which is connected to the multifunction peripheral via a network such as a Network Attached Storage (NAS), and the like, correspond to the input/output information for the multifunction peripheral.

1.1 Functional Configuration

Figure 1:
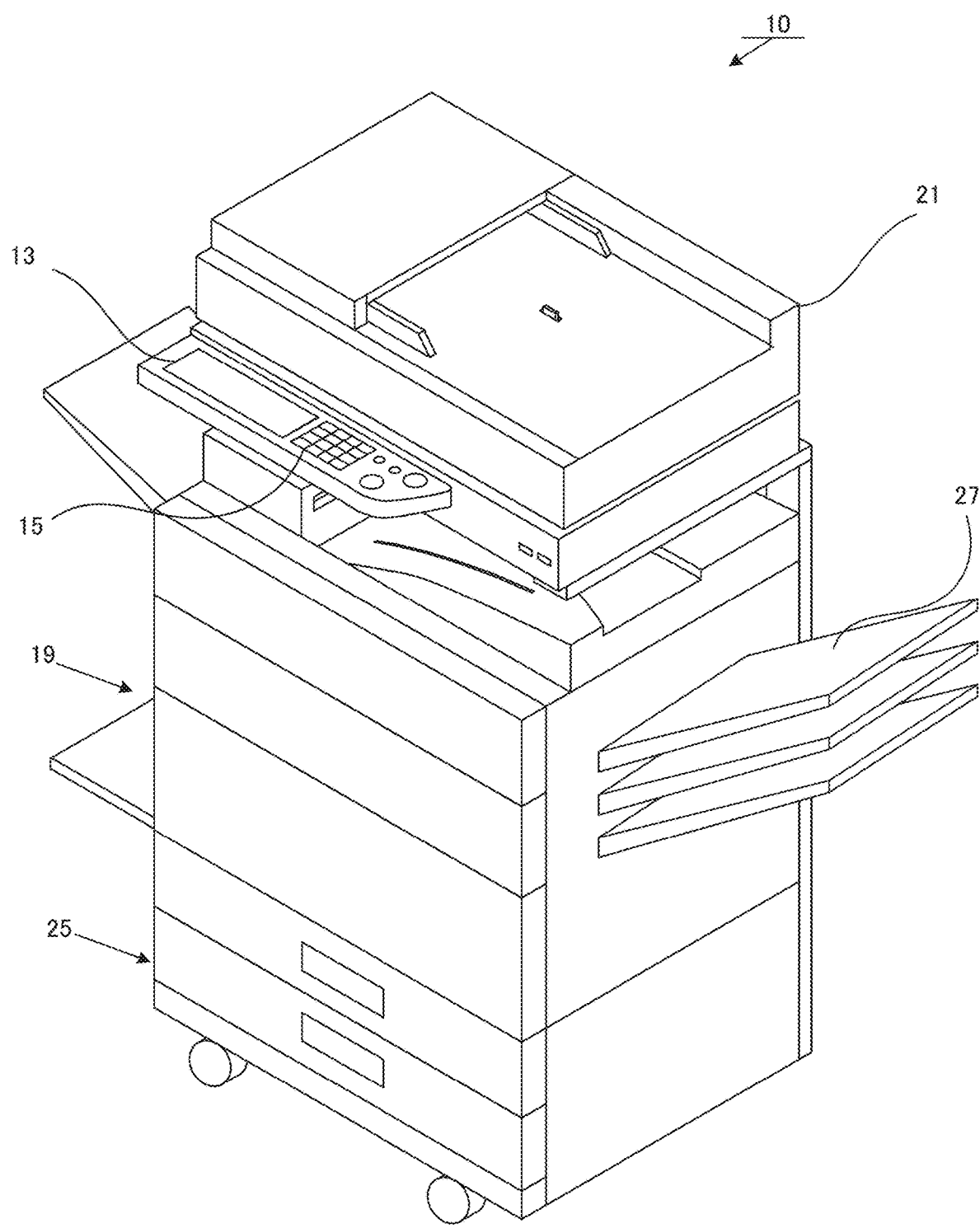
FIG. 1 is a diagram illustrating an overall configuration of a multifunction peripheral according to a first embodiment.
Figure 2:
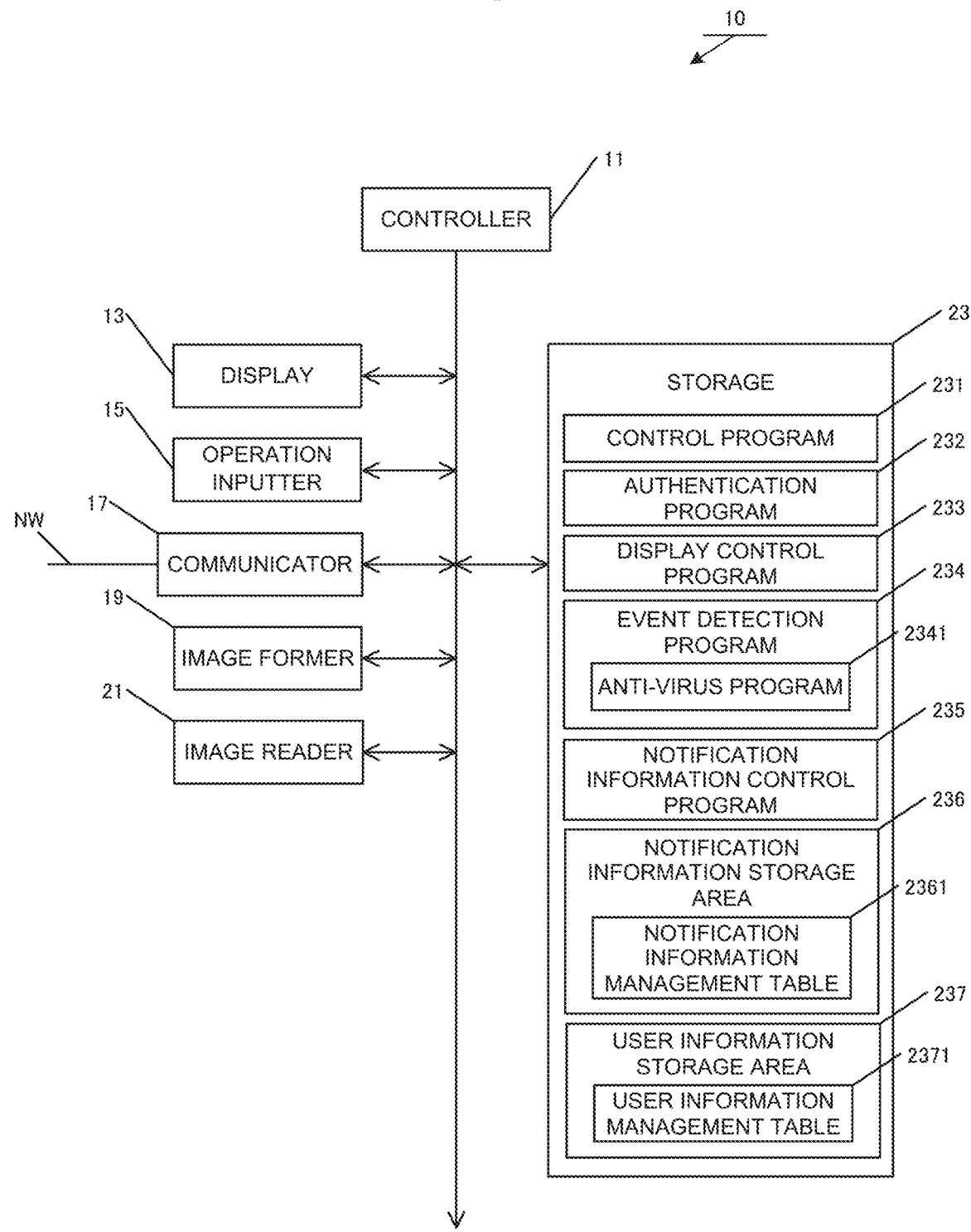
FIG. 2 is a functional configuration diagram of the multifunction peripheral according to the first embodiment.

A functional configuration of a multifunction peripheral 10 according to the first embodiment will be described with reference to FIGS. 1 and 2. FIG. 1 is an external perspective view which schematically illustrates an overall configuration of the multifunction peripheral 10. FIG. 2 is a functional configuration diagram of the multifunction peripheral 10. The multifunction peripheral 10 includes a controller 11, a display 13, an operation inputter 15, a communicator 17, an image former 19, an image reader 21, and a storage 23.

The controller 11 controls the multifunction peripheral 10 as a whole. The controller 11 is configured from, for example, one or more arithmetic devices (such as central processing units [CPUs]). The controller 11 reads and executes various programs stored in the storage 23, thereby implementing functions thereof.

The display 13 displays various kinds of information to a user or the like. The display 13 can be composed of a display device such as a liquid crystal display (LCD) or an organic electro-luminescence (EL) display.

The operation inputter 15 receives input of information by the user or the like. The operation inputter 15 can be configured from, for example, a hardware key such as a numeric keypad, buttons, and the like. The operation inputter 15 can also be configured as a touch panel that allows input via the display 13. In this case, for example, a common method such as a resistive method, an infrared method, an electromagnetic induction method, or a capacitive sensing method may be employed as an input method for the touch panel.

The communicator 17 is provided with either of or both of wired and wireless interfaces to communicate with another device via a network such as a local area network (LAN), a wide area network (WAN), the Internet, or a public switched telephone network.

The image former 19 forms, on paper serving as a recording medium, an image based on image data. The image former 19 feeds paper from a paper feeder 25, forms an image based on the image data on the paper, and then discharges the paper to a paper discharger 27. The image former 19 can be configured from, for example, a laser printer using an electrophotographic method. In this case, the image former 19 forms an image by using toners supplied from toner cartridges, which are not illustrated, corresponding to respective toner colors (e.g., cyan, magenta, yellow, and black).

The image reader 21 scans and reads a document image to be read, and the image data is thus generated. The image reader 21 may be configured as a scanner device including an image sensor such as a charge coupled device (CCD) or a contact image sensor (CIS). The configuration of the image reader 21 is not restricted as long as the image reader 21 is configured to generate image data by reading a reflected light image from a document image with an image sensor.

The storage 23 stores therein various kinds of data and various programs necessary for operation of the multifunction peripheral 10. The storage 23 can be configured from storage devices such as a random-access memory (RAM), a hard disk drive (HDD), a solid state drive (SSD), and a read-only memory (ROM). The storage 23 may be provided on a NAS (not shown) connected via a network NW.

In the first embodiment, the storage 23 stores a control program 231, an authentication program 232, a display control program 233, an event detection program 234, and a notification information control program 235, and reserves a notification information storage area 236 and a user information storage area 237.

The control program 231 is a program that the controller 11 reads in order to perform processing under a specific operation mode, such as copying, faxing, scanning, and e-mail transmission. As the controller 11 which has read the control program 231 controls the display 13, the operation inputter 15, the communicator 17, the image former 19, the image reader 21, and the like, jobs such as copying, faxing, scanning, and e-mail transmission are executed.

The authentication program 232 is a program that the controller 11 reads in authenticating a user who logs into the multifunction peripheral 10. The controller 11 which has read the authentication program 232 displays, when an authentication function is enabled, a login screen (not shown) to a user who attempts to log into the multifunction peripheral 10. The controller 11 stores in advance, for example, a login user name as the administrator and a login password in association with each other, and can perform user authentication as the administrator by verifying the login user name and the login password that have been input via the login screen. Further, in addition to password authentication (knowledge-based authentication) which is based on an input of the login user name and the login password, the user authentication can also be performed by possession authentication using a token, a key, an IC card, a smartphone, etc., or biometric authentication such as fingerprint authentication, palm print authentication, vascular authentication, and face authentication, or by multifactor authentication which is a combination of the above types of authentication. Also, the controller 11 which has read the authentication program 232 functions as an authenticator, and performs administrator authentication when receiving an instruction to erase notification information which will be described later.

The display control program 233 is a program that the controller 11 reads in controlling the display 13 and the operation inputter 15. The controller 11 which has read the display control program 233 controls output of a notification information screen which will be described later, various setting screens, a home screen which receives an instruction to display the aforementioned screens and performs switching of the display, etc. In the present disclosure, the controller 11 is described as a device that controls input/output of the touch panel which is one form of the display 13 and the operation inputter 15 being integrally formed as a single unit. However, it is needless to say that the display 13 and the operation inputter 15 can be controlled independently from each other.

The event detection program 234 is a program that the controller 11 reads in detecting various events which occur in the multifunction peripheral 10. In the first embodiment, the event detection program 234 is described as a program having an anti-virus program 2341. As the controller 11 reads the anti-virus program 2341, the anti-virus program 2341 functions as an anti-virus application. The controller 11 which has read the anti-virus program 2341 performs pattern matching with a pattern file, thereby performing virus quarantine on the firmware data of the multifunction peripheral 10, the embedded program data, the data related to execution of a job, the address book data, the data which has been generated by execution of a job and is saved in the multifunction peripheral for reuse as save data, and the data saved in, for example, a storage device which is connected to the multifunction peripheral via a network such as the NAS. The event detection program 234 may take the form of implementing the anti-virus program 2341, as a part of the event detection program 234 via, for example, an application programming interface (API), as illustrated in FIG. 2, or the event detection program 234 may be the anti-virus program 2341 itself.

The notification information control program 235 determines whether the notification information to be displayed on the display 13 should be applied as notification information for which the operation authority is restricted to the administrator or should be applied as notification information for which the operation authority is unrestricted. The controller 11 which has read the notification information control program 235 determines that, when an occurred event corresponds to detection of a virus infecting the device information that can be operated only by the administrator, the notification information to be displayed on the display 13 is applied as the notification information for which the operation authority is restricted to the administrator. Meanwhile, the controller 11 determines that, when an occurred event corresponds to detection of a virus infecting the input/output information for the multifunction peripheral, the notification information to be displayed on the display 13 is applied as the notification information for which the operation authority is unrestricted.

The notification information storage area 236 is a storage area for storing messages to be displayed to the user and the notification information to be notified. The notification information storage area 236 manages the stored notification information as a notification information management table 2361. The notification information management table 2361 will now be described with reference to FIG. 3A.

FIG. 3A is a diagram illustrating an example of a data configuration of the notification information management table 2361. The notification information management table 2361 includes the following as management items: Notification ID, Event, Message File, Administrator Notification, Notification Information File, Authentication, and Storage Location. The Notification ID is an identifier to uniquely identify the message or the notification information to be notified to the user. The notification information management table 2361 can manage the message to be displayed to the user and the notification information in association with the notification ID. The Event indicates the type of event which has occurred in the multifunction peripheral 10. The Message File indicates a file (e.g., the name of a text file) that stores the message contents corresponding to the occurred event. The Administrator Notification represents a flag indicating whether or not the notification information including a message needs to be notified to the administrator. The Notification Information File represents a file (e.g., the name of a text file) that stores the contents of notification of the occurred event. The Authentication represents a flag indicating whether or not the operation authority over the notification information (the file) (i.e., the authority to erase the notification information in the present disclosure) is restricted to the administrator. In the present disclosure, as one aspect of whether the operation authority is restricted to the administrator, necessity of authentication by the administrator will be described as one example. The Storage Location indicates an address of the notification information storage area 236 where the message files and the notification information files are stored.

For example, a notification identified by notification ID "#001" indicates that the notification is based on an occurrence of an event, which is "virus infection". At this time, a message based on "ma01-1.txt" is displayed on the display 13. Further, when notification information, which is based on a notification information file "ma01-2.txt" whose contents of notification indicate that administrator notification is required, is displayed, it is indicated that the administrator authentication is necessary to erase the notification information (Authentication; Yes). The notification information exemplified by notification ID "#001" may be referred to as notification information of notification type 1 in the following description.

Further, a notification identified by notification ID "#002" indicates that the notification is based on an occurrence of an event, which is "virus infection". At this time, a message based on "mn01-1.txt" is displayed on the display 13. Further, when notification information, which is based on a notification information file "mn01-2.txt" whose contents of notification indicate that no administrator notification is required, is displayed, it is indicated that the administrator authentication is not necessary to erase the notification information (Authentication; No). The notification information exemplified by notification ID "#002" may be referred to as notification information of notification type 2 in the following description.

Notifications based on an occurrence of an event may include the following cases other than the examples of notification ID "#001" and "#002" that have been exemplified. That is, a machine trouble (for example, a serious machine trouble (#003), as a result of which the administrator needs to contact a serviceman, or a minor machine trouble (#004) that can be dealt with by a general user by replacement of parts), a network trouble (for example, a serious network trouble (#005), as a result of which the administrator needs to take action on a network device or the like, or a minor network trouble (#006) which can be resolved by a general user), etc., may also be the cause of the notification.

Referring to FIG. 2 again, the user information storage area 237 is a storage area for storing user information on the users who operate the multifunction peripheral 10. The user information storage area 237 manages the stored user information as a user information management table 2371. The user information management table 2371 will now be described with reference to FIG. 3B.

FIG. 3B is a diagram illustrating an example of a data configuration of the user information management table 2371. The user information management table 2371 includes the following as management items: User ID, User Name, Password, Group, and E-mail Address.

The User ID is an identifier to uniquely identify the user who operates the multifunction peripheral 10. The User Name indicates the user name of the authenticated user. The Password indicates an authentication password set for the authenticated user. The Group indicates a group to which the authenticated user belongs (i.e., operation authority). The E-mail Address indicates an e-mail address which is a contact address of the authenticated user.

For example, user ID "000111222" indicates the user ID allocated to the authenticated user name "yamada ichiro", and exemplifies that "*****" is set as the authentication password for authentication. It is exemplified that the authenticated user name "yamada ichiro" belongs to "administrator" as a belonging group, and the operation authority of the administrator is given.

Meanwhile, user ID "333444555" indicates the user ID allocated to the authenticated user name "tanaka jiro", and exemplifies that "*****" is set as the authentication password for authentication. It is exemplified that the authenticated user name "tanaka jiro" belongs to "general (user)" as the belonging group, and the operation authority of the general (user) is given.

The items managed by the user information management table 2371 are used at the time of a login to the multifunction peripheral 10 or for administrator authentication when an instruction to erase the notification information is received.

1.2 Flow of Processing

Figure 4:
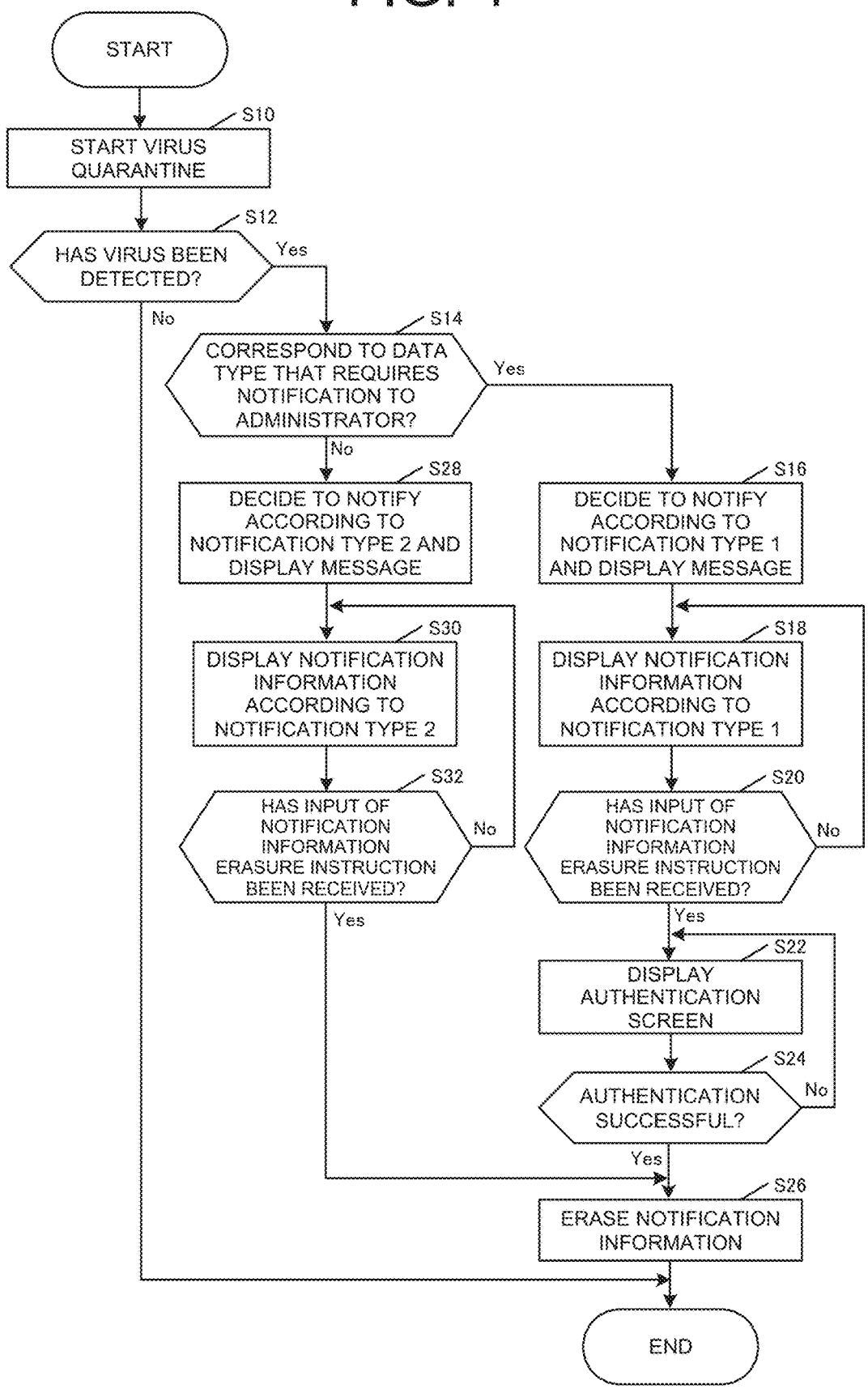
FIG. 4 is a flowchart illustrating a flow of processing according to the first embodiment.

Next, a flow of processing according to the first embodiment will be described. FIG. 4 is a flowchart illustrating a flow of processing of the first embodiment. The processing described with reference to FIG. 4 is that executed by the controller 11 as the controller 11 reads the control program 231, the authentication program 232, the display control program 233, the event detection program 234 (the antivirus program 2341), and the notification information control program 235.

First, the controller 11 starts virus quarantine (step S10). Then, the controller 11 determines whether a virus has been detected (step S12).

If it is determined that a virus has been detected, the controller 11 determines whether data infected with the virus is of a data type that requires notification to the administrator (Yes in step S12→step S14). In the first embodiment, the data type that requires notification to the administrator refers to data, which is device information that can be operated only by the administrator and for which the operation authority is restricted to the administrator. For example, firmware data of a multifunction peripheral, embedded program data, and the like, correspond to the above data type. Meanwhile, the data type that does not require notification to the administrator refers to data, which is input/output information for a multifunction peripheral, and for which the operation authority is not restricted and which can be operated by any user irrespective of whether he/she is the administrator or a general user. For example, data related to execution of a job, address book data, data which has been generated by execution of a job and is saved in the multifunction peripheral for reuse as save data, and data saved in, for example, a storage device which is connected to the multifunction peripheral via a network such as a NAS, and the like, correspond to the above data type. Incidentally, if it is determined that no virus has been detected, the controller 11 ends the processing (No in step S12→End).

If it is determined that the data infected with the virus is of a data type that requires notification to the administrator, the controller 11 decides to make a notification according to notification type 1 and displays a message pertaining to the notification type 1 on the display 13 (Yes in step S14→step S16).

Then, when the controller 11 receives an instruction to display notification information pertaining to notification type 1, the controller 11 displays the notification information (step S18).

The controller 11 determines whether an instruction to erase the notification information is received in a state in which the notification information pertaining to notification type 1 is displayed (step S20). If it is determined that an instruction to erase the notification information is received, the controller 11 displays an authentication screen for the administrator (Yes in step S20→step S22). In contrast, if it is determined that no instruction to erase the notification information has been received, the controller 11 continuously displays the notification information (No in step S20→step S18).

After displaying the authentication screen, the controller 11 determines whether administrator authentication is successful (step S24). If it is determined that the administrator authentication is successful, the controller 11 performs control to erase or hide the notification information, and ends the processing (Yes in step S24—step S26). Meanwhile, if it is determined that the administrator authentication is unsuccessful, the controller 11 continuously displays the authentication screen (No in step S24→step S22).

Incidentally, if it is determined that the data infected with the virus is not of a data type that requires notification to the administrator, the controller 11 decides to make a notification according to notification type 2 and displays a message pertaining to the notification type 2 on the display 13 (No in step S14→step S28).

Then, when the controller 11 receives an instruction to display notification information pertaining to notification type 2, the controller 11 displays the notification information (step S30).

The controller 11 determines whether an instruction to erase the notification information is received in a state in which the notification information pertaining to notification type 2 is displayed (step S32). If it is determined that an instruction to erase the notification information is received, the controller 11 performs control to erase or hide the notification information, and the processing is ended (Yes in step S32—step S26). In contrast, if it is determined that no instruction to erase the notification information has been received, the controller 11 continuously displays the notification information (No in step S32→step S30).

Incidentally, in step S16 or step S28 of FIG. 4, the message to be displayed on the display 13 according to each notification type may be omitted, and the notification information according to each notification type may be directly displayed on the display 13 after a decision on the notification type has been made.

1.3 Operation Examples

Figure 5:
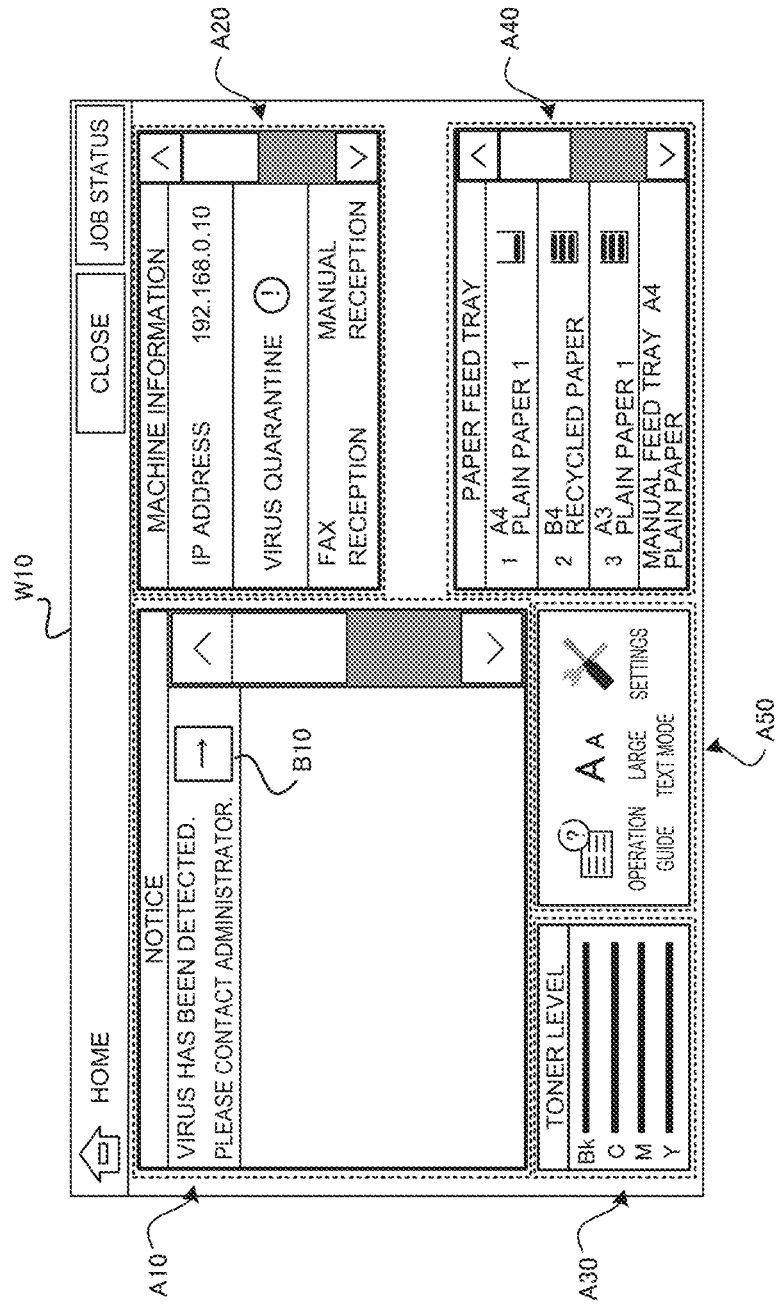
FIG. 5 is a diagram illustrating an operation example according to the first embodiment.

Next, operation examples according to the first embodiment will be described. FIG. 5 is a diagram illustrating a configuration example of a system information screen W10 according to the first embodiment. The system information screen W10 is displayed on the display 13 when a virus has been detected by virus quarantine (i.e., at the time of event detection). The system information screen W10 can also be displayed via the home screen (not shown).

The system information screen W10 has a screen configuration consisting of five areas, which are a notice area A10, a machine information area A20, a toner level area A30, a paper feed tray area A40, and a function key area A50.

The notice area A10 is an area for displaying a message regarding an event which has occurred. The notice area A10 related to FIG. 5 illustrates an example which displays a message indicating that the event which has occurred corresponds to virus infection, and notification to the administrator is required. Note that the present operation example is an operation example corresponding to processing related to step S16 of FIG. 4. Further, the contents of the message displayed in the notice area A10 correspond to the message contents stored in the message file "ma01-1.txt" of notification ID "#001" in FIG. 3A. FIG. 5 illustrates, as a message which requests notification to the administrator, an example which displays a message that reads "Virus has been detected. Please contact administrator." as the contents thereof.

In addition, in the notice area A10, a notification information display button B10 is provided. When the notification information display button B10 is selected by the user, the controller 11 displays a notification information screen N10, which will be described referring to the subsequent figure.

The machine information area A20 is an area for displaying the device status of the multifunction peripheral 10 (the machine). FIG. 5 illustrates an example which displays, as machine information, the IP address of the multifunction peripheral, the fact that virus quarantine is being executed, and the fact that the setting of fax reception is set to manual reception.

The toner level area A30 is an area for displaying the toner level of black (Bk), cyan (C), magenta (M), and yellow (Y). The paper feed tray area A40 is an area for displaying the type of paper set in a paper feed tray and the remaining amount of the paper.

The function key area A50 is an area for displaying, as function keys, the functions that can be set via the system information screen W10. FIG. 5 exemplifies, as an example of the functions that can be set, an operation guide display function, a large text mode function, and a setting function, as the function keys.

Incidentally, the screen configuration of the system information screen W10 exemplified in FIG. 5 is merely an example, and each area which constitutes the system information screen W10 and the contents of display can be set as appropriate. Also, in the present operation example, a description is given on a mode in which a message regarding the occurred event is displayed in the notice area A10 of the system information screen W10. However, the mode is not limited to the above, and the message can alternatively be displayed on the display 13 as a message screen independent of the system information screen W10.

Figure 6:
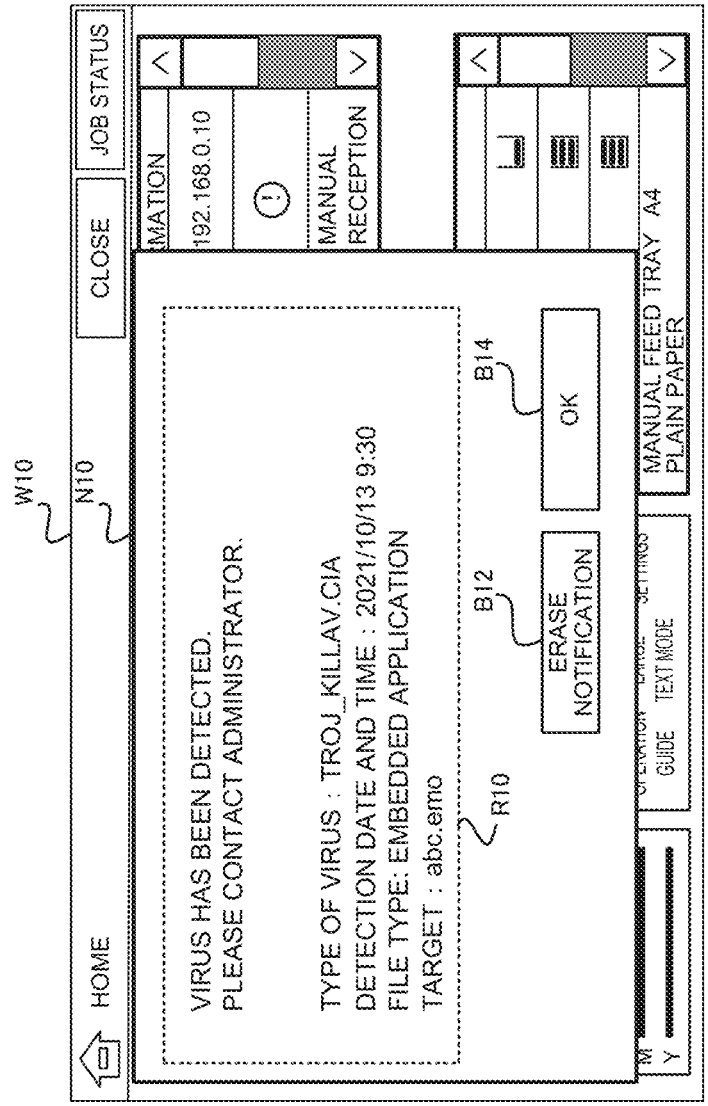
FIG. 6 is a diagram illustrating an operation example according to the first embodiment.

FIG. 6 is a diagram illustrating a configuration example of the notification information screen N10 that is displayed by the controller 11 when the notification information display button B10 in the notice area A10 is selected. The present operation example corresponds to the processing of step S18 of FIG. 4. As exemplified in FIG. 6, the controller 11 can display the notification information screen N10 on the system information screen W10 in a superimposed manner.

The notification information screen N10 includes a notification information display area R10, an Erase Notification button B12, and an OK button B14.

The notification information display area R10 is a display area for displaying notification information related to virus detection. FIG. 6 illustrates an example in which, in addition to the contents "Virus has been detected. Please contact administrator." as the notification information, the following are displayed: type of virus "TROJ_KILLAV.CIA", detection date and time "2021/10/13 9:30", file type "embedded application", and target "abc.emo". The contents displayed in the notification information display area R10 correspond to the message contents stored in the notification information file "ma01-2.txt" of notification ID "#001" in FIG. 3A.

The Erase Notification button B12 is a button which receives an instruction to erase the notification information displayed in the notification information display area R10. When the Erase Notification button B12 is selected by the user, the controller 11 displays an administrator authentication screen, which will be described referring to the subsequent figure, on the display 13.

The OK button B14 is a button which receives acceptance of the notification information notified in the notification information display area R10. When the OK button B14 is selected by the user, the controller 11 returns the display screen to the system information screen W10. In this case, the controller 11 does not erase the notification information displayed in the notification information display area R10.

Figure 7:
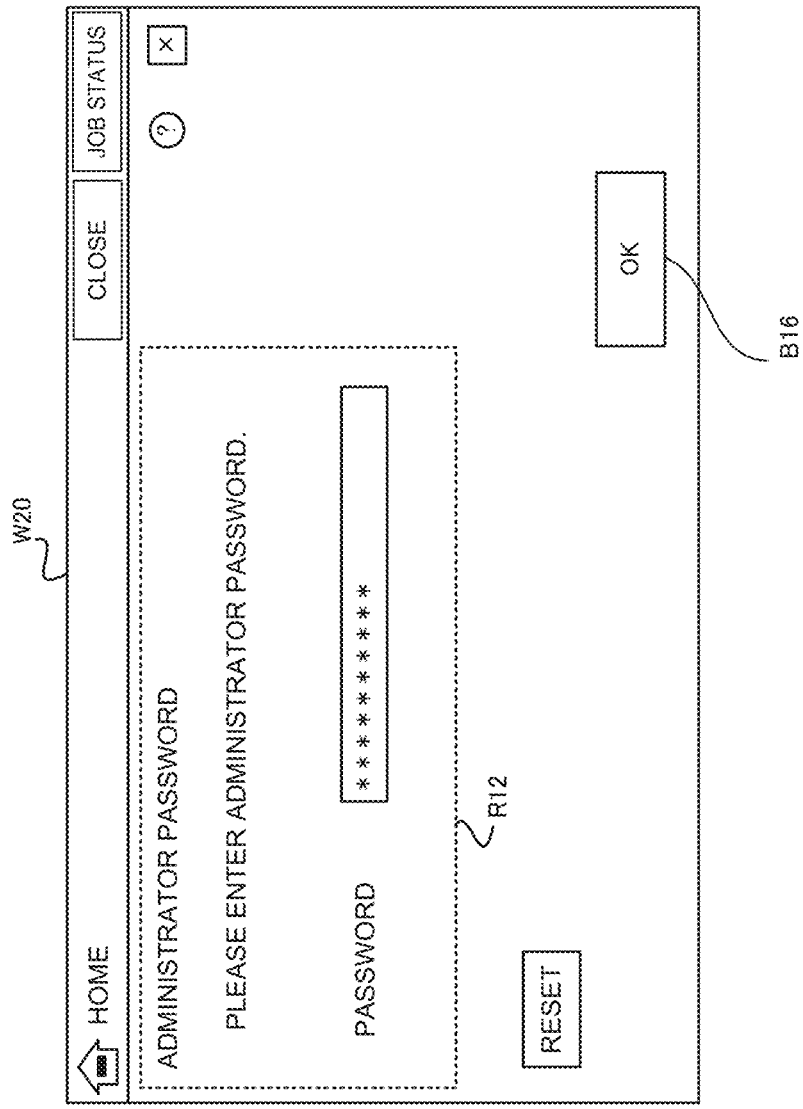
FIG. 7 is a diagram illustrating an operation example according to the first embodiment.

FIG. 7 is a diagram illustrating a configuration example of an administrator authentication screen W20 that is displayed by the controller 11 when the Erase Notification button B12 on the notification information screen N10 is selected.

The administrator authentication screen W20 includes an administrator password input area R12 and an OK button B16. The administrator password input area R12 is an area for receiving input of a password by the administrator. The OK button B16 is a button which receives input of an instruction to confirm the password input by the administrator.

When a password is input to the administrator password input area R12 by the administrator and the OK button B16 is selected by the administrator, the controller 11 authenticates the administrator by referring to the user information management table 2371 illustrated in FIG. 3B. If the authentication of the administrator is successful (Yes in step S24 of FIG. 4), the controller 11 performs control to erase or hide the notification information displayed in the notification information display area R10. In contrast, if the authentication of the administrator fails (No in step S24 of FIG. 4), the controller 11 returns the display screen to the notification information screen N10.

Figure 8:
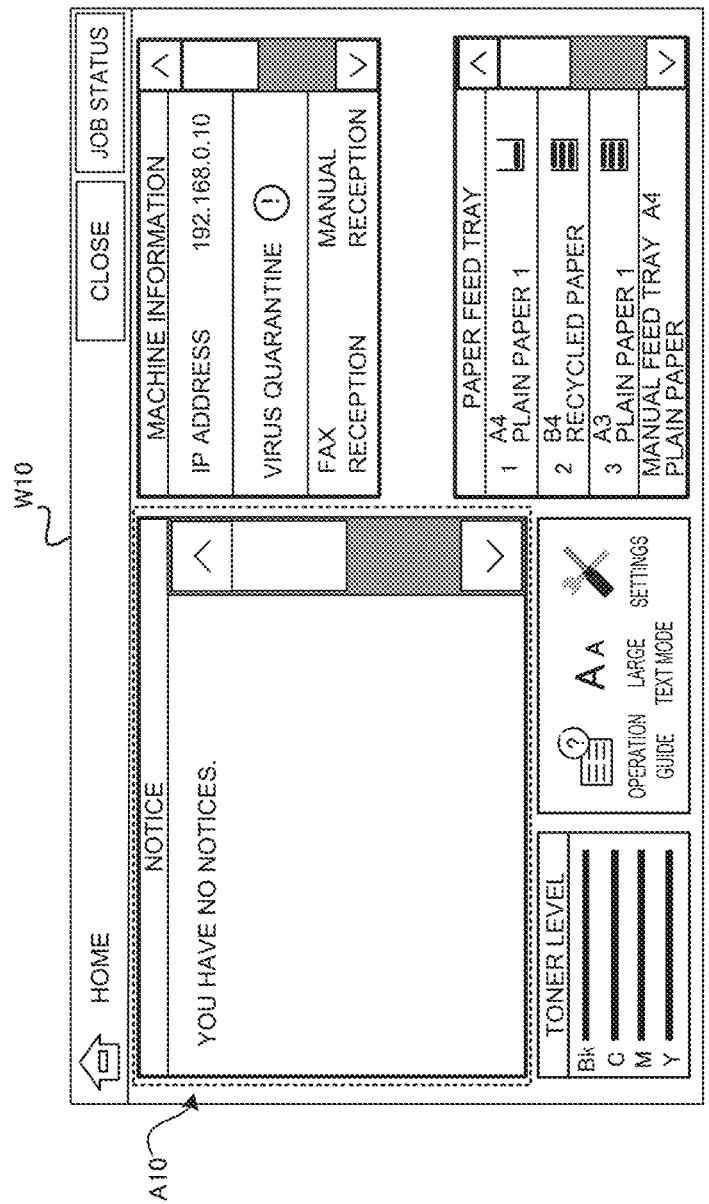
FIG. 8 is a diagram illustrating an operation example according to the first embodiment.

FIG. 8 is a diagram illustrating a display example of a message displayed in the notice area A10 of the system information screen W10 after an instruction to erase the notification information displayed in the notification information display area R10 has been given. FIG. 8 illustrates an example which displays that there is no notification information to be notified ("You have no notices."), which results from the erasure or hiding of the notification information displayed in the notification information display area R10. At this time, the message displayed in the notice area A10 exemplified in FIG. 5 is also erased or hidden.

Figure 9:
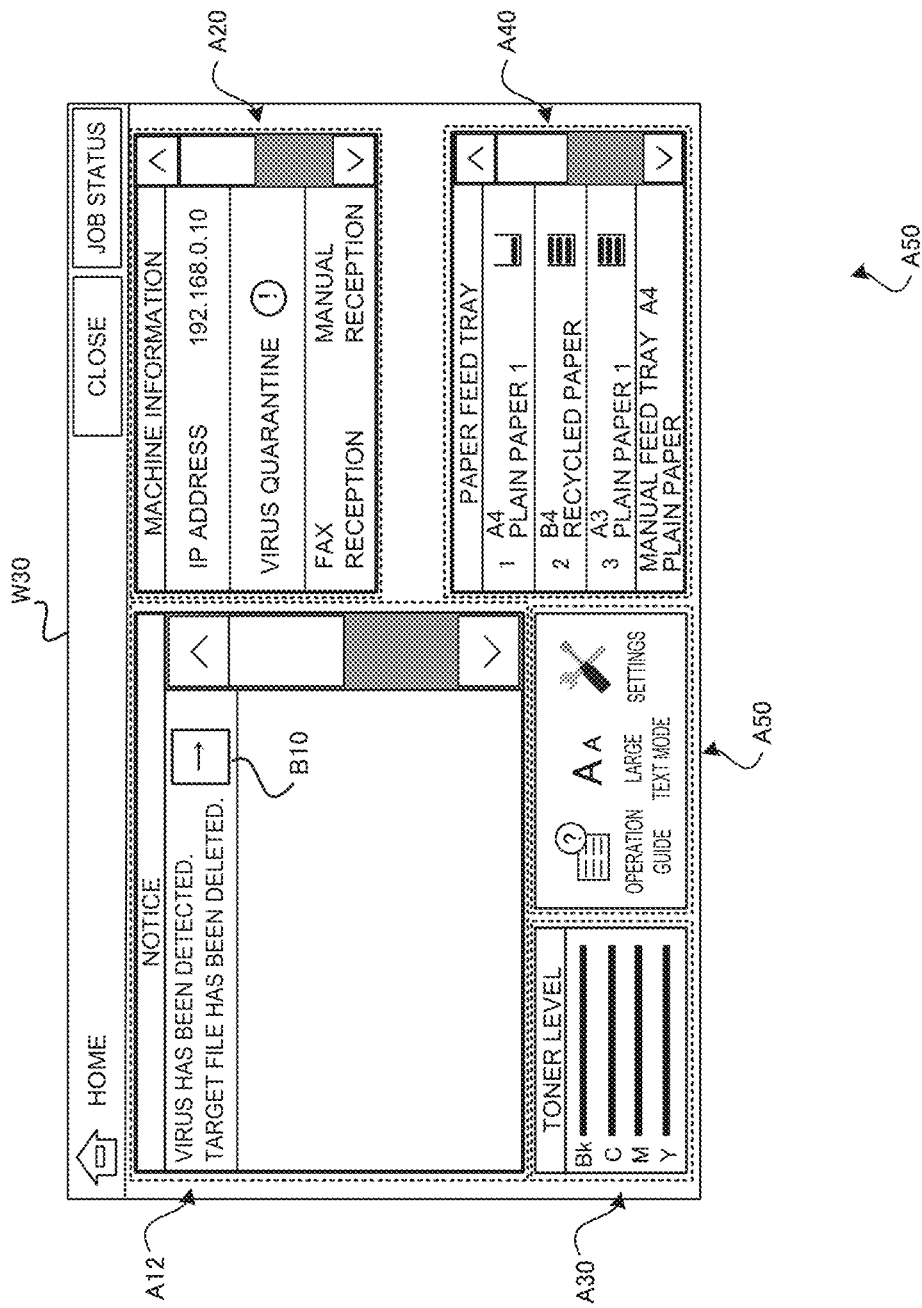
FIG. 9 is a diagram illustrating an operation example according to the first embodiment.

FIG. 9 is a diagram illustrating a configuration example of a system information screen W30 including a notice area A12 which displays message indicating that the event which has occurred corresponds to virus infection, and no notification to the administrator is required. Since a screen configuration of the system information screen W30 may be of the same configuration as the system information screen W10, the screen configuration will not be described here.

The present operation example is an operation example corresponding to processing related to step S28 of FIG. 4. Further, the contents of the message displayed in the notice area A12 correspond to the message contents stored in the message file "mn01-1.txt" of notification ID "#002" in FIG. 3A. FIG. 9 illustrates, as a message which does not request notification to the administrator, an example which displays a message that reads "Virus has been detected. Target file has been deleted." as the contents thereof.

In addition, in the notice area A12, the notification information display button B10 is provided. When the notification information display button B10 is selected by the user, the controller 11 displays a notification information screen N12, which will be described referring to the subsequent figure.

Figure 10:
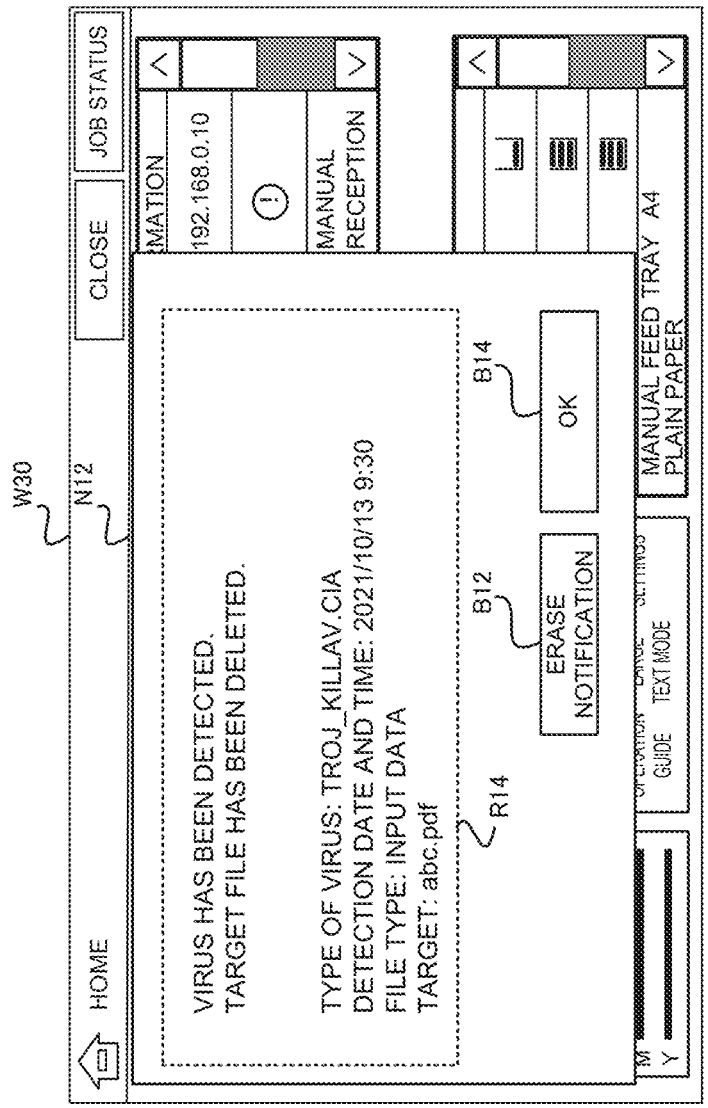
FIG. 10 is a diagram illustrating an operation example according to the first embodiment.

FIG. 10 is a diagram illustrating a configuration example of the notification information screen N12 that is displayed by the controller 11 when the notification information display button B10 in the notice area A12 is selected. The present operation example corresponds to the processing of step S30 of FIG. 4. As exemplified in FIG. 10, the controller 11 can display the notification information screen N12 on the system information screen W30 in a superimposed manner.

The notification information screen N12 includes a notification information display area R14, the Erase Notification button B12, and the OK button B14.

The notification information display area R14 is a display area for displaying notification information related to virus detection. FIG. 10 illustrates an example in which, in addition to the contents "Virus has been detected. Target file has been deleted." as the notification information, the following are displayed: type of virus "TROD KILLAV.CIA", detection date and time "2021/10/13 9:30", file type "input data", and target "abc.pdf". The contents displayed in the notification information display area R14 correspond to the message contents stored in the notification information file "mn01-2.txt" of notification ID "#002" in FIG. 3A.

The Erase Notification button B12 is a button which receives an instruction to erase the notification information displayed in the notification information display area R14. When the Erase Notification button B12 is selected by the user, the controller 11 performs control to erase or hide the notification information displayed in the notification information display area R14.

Further, as in FIG. 8, the controller 11 displays that there is no notification information to be notified ("You have no notices.") in the notice area A12 of the system information screen W30 by erasing or hiding the notification information displayed in the notification information display area R14.

The OK button B14 is a button which receives acceptance of the notification information notified in the notification information display area R14. When the OK button B14 is selected by the user, the controller 11 closes the notification information screen N12 and returns the display screen to the system information screen W30. In this case, the controller 11 retains the notification information displayed in the notification information display area R14 without erasing the notification information.

As described above, according to the first embodiment, it is possible to provide an image processing apparatus and the like which detects an occurrence of an event, and displays notification information regarding the event which has occurred on a display, in which when the notification information corresponds to a notification for a specific user, operation authority over the notification information displayed on the display is restricted to the specific user, and when the notification information does not correspond to a notification for the specific user, the operation authority over the notification information displayed on the display is made unrestricted. By such a configuration, the image processing apparatus and the like can certainly notify an administrator of the notification information which should be checked and acted upon by the administrator.

2 Second Embodiment

A second embodiment represents an embodiment which monitors a device condition of a multifunction peripheral 30, and restricts, according to an operation performed by a user on the multifunction peripheral or a device error which has occurred as an event, operation authority over notification information displayed on a display to a specific user or makes the operation authority unrestricted.

2.1 Functional Configuration

Figure 11:
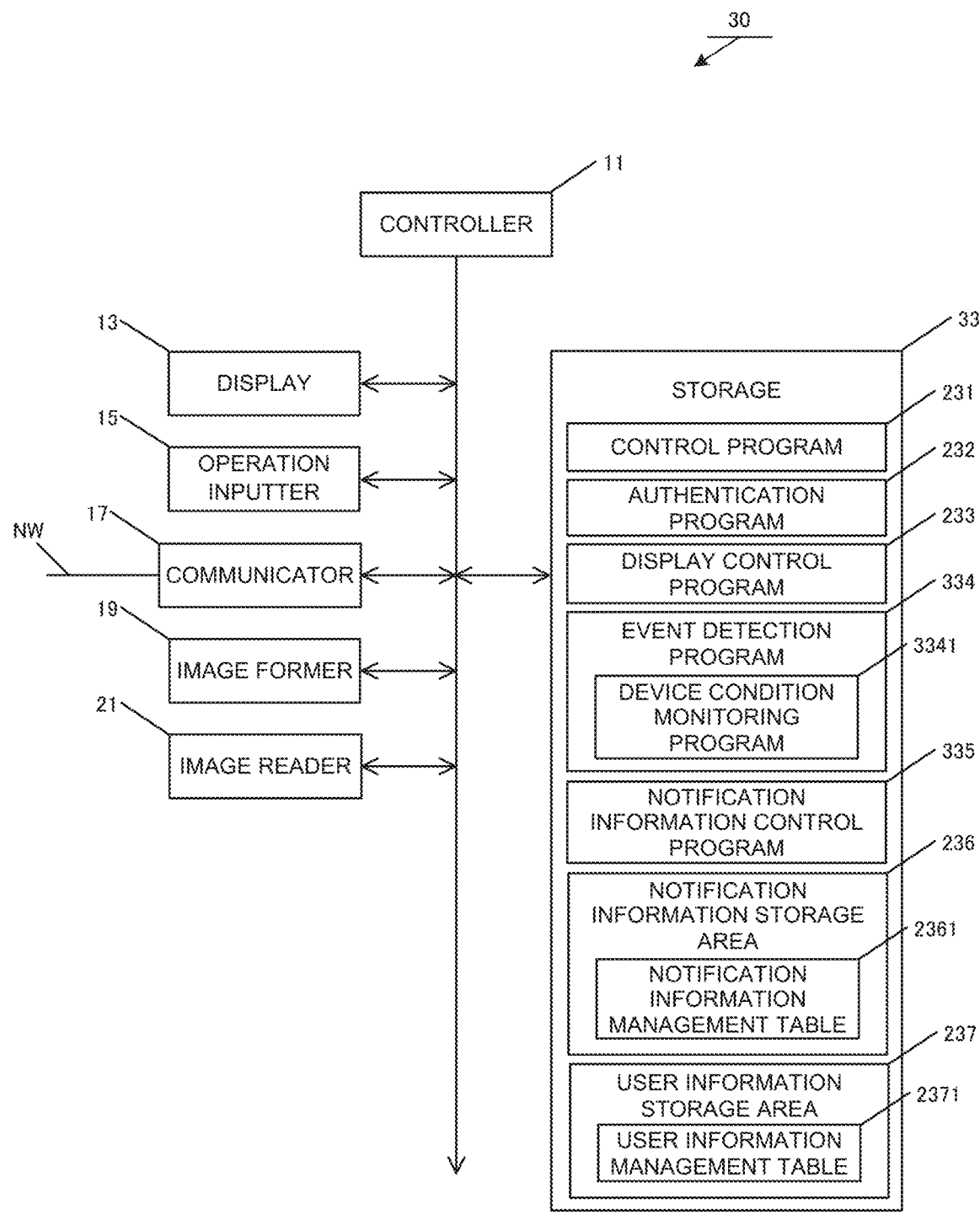
FIG. 11 is a functional configuration diagram of a multifunction peripheral according to a second embodiment.

FIG. 11 is a functional configuration diagram of the multifunction peripheral 30 according to the second embodiment. The multifunction peripheral 30 is provided with a storage 33 instead of the storage 23 of the multifunction peripheral 10 according to the first embodiment. Since the functional configuration other than the above can be made the same as the configuration of the multifunction peripheral 10 according to the first embodiment, description thereof will not be provided here.

In the second embodiment, the storage 33 stores a control program 231, an authentication program 232, a display control program 233, an event detection program 334, and a notification information control program 335, and reserves a notification information storage area 236 and a user information storage area 237.

The event detection program 334 is a program that a controller 11 reads in detecting various events which occur in the multifunction peripheral 30. In the second embodiment, the event detection program 334 is described as a program having a device condition monitoring program 3341. The controller 11 which has read the device condition monitoring program 3341 monitors the device condition of the multifunction peripheral 30, and determines the type of an operation performed by the user on the multifunction peripheral 30 or a device error which has occurred and the contents thereof. In the second embodiment, as one aspect of the operation performed by the user on the multifunction peripheral 30, a login operation and job execution will be described, and as one aspect of the device error that has occurred in the multifunction peripheral 30, a device error will be described. Content of operation by the user and the device error that occurs described in the present specification are merely examples, and the embodiments of the present disclosure are not limited to the descriptions.

The notification information control program 335 determines whether notification information to be displayed on a display 13 should be applied as notification information for which the operation authority is restricted to an administrator or should be applied as notification information for which the operation authority is unrestricted. The controller 11 which has read the notification information control program 335 determines that the notification information to be displayed on the display 13 is applied as the notification information for which the operation authority is restricted to the administrator when an operation performed on the multifunction peripheral 30 corresponds to a specific situation related to the login operation, when a job executed in the multifunction peripheral 30 corresponds to a specific job, and when a device error which has occurred in the multifunction peripheral 30 corresponds to a specific error type. Meanwhile, the controller 11 determines that the notification information to be displayed on the display 13 is applied as the notification information for which the operation authority is unrestricted when an operation performed on the multifunction peripheral 30 does not correspond to a specific situation related to the login operation, when a job executed in the multifunction peripheral 30 does not correspond to a specific job, and when a device error which has occurred in the multifunction peripheral 30 does not correspond to a specific error type.

2.2 Flow of Processing

Figure 12:
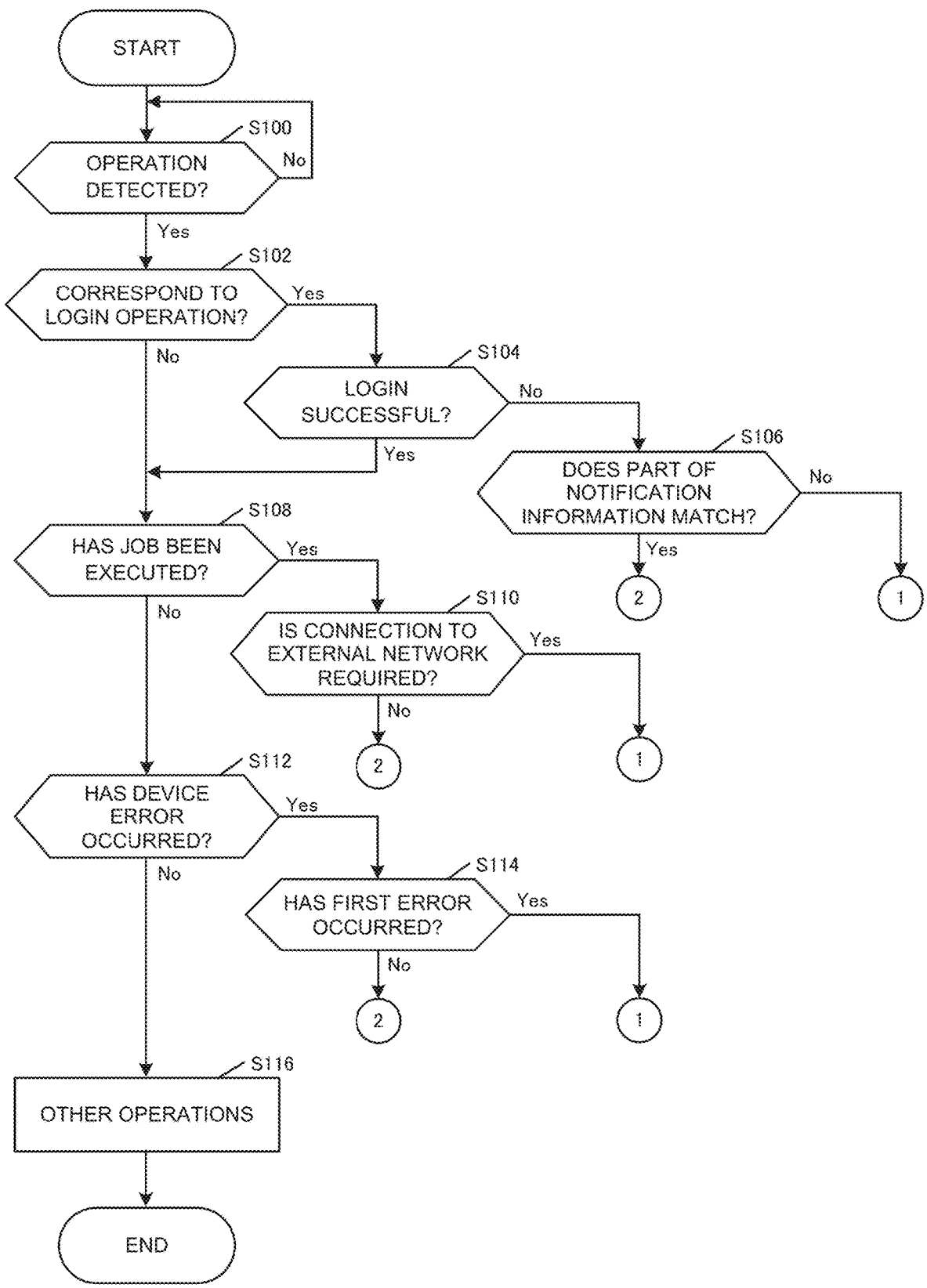
FIG. 12 is a flowchart illustrating a flow of processing according to the second embodiment.
Figure 13:
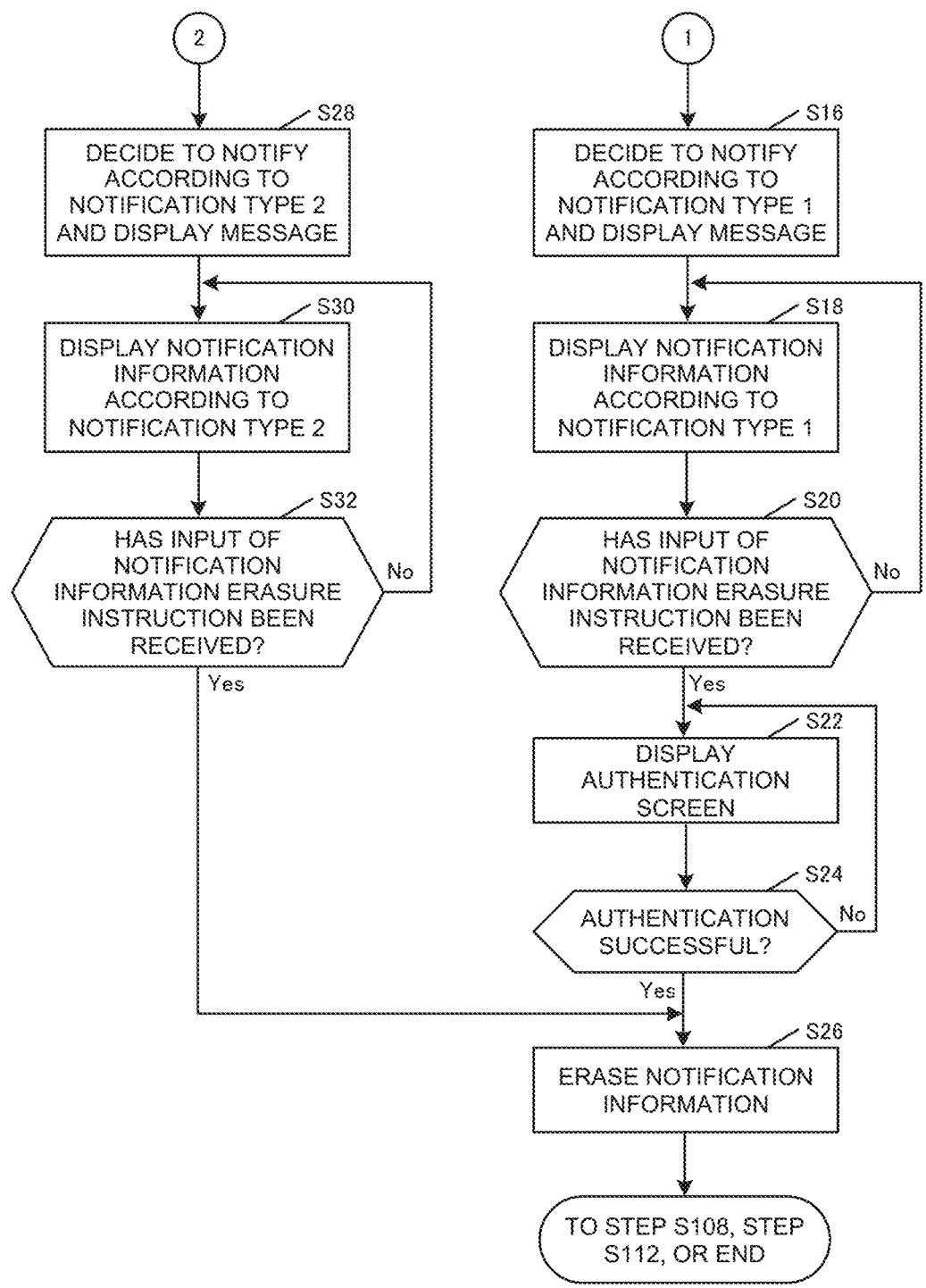
FIG. 13 is a flowchart illustrating a flow of processing according to the second embodiment.

Next, a flow of processing according to the second embodiment will be described. FIGS. 12 and 13 are flowcharts illustrating a flow of processing according to the second embodiment. The processing described with reference to FIGS. 12 and 13 is that executed by the controller 11 of the multifunction peripheral 30 as the controller 11 reads the control program 231, the authentication program 232, the display control program 233, the event detection program 334 (the device condition monitoring program 3341), and the notification information control program 335. Parts that can be made the same as the processing described with reference to FIG. 4 of the first embodiment may be denoted by the same step numbers, and descriptions of such parts may be omitted.

First, the controller 11 determines whether an operation has been performed on the multifunction peripheral 30 (step S100). If it is determined that an operation to the multifunction peripheral 30 is detected, the controller 11 determines whether the content of operation is a login operation to the multifunction peripheral 30 (Yes in step S100→step S102). Meanwhile, if it is determined that no operation has been detected for the multifunction peripheral 30, the controller 11 waits until an operation is performed on the multifunction peripheral 30 (No in step S100).

If the controller 11 determines that the content of operation is a login operation to the multifunction peripheral 30, the controller 11 determines whether login authentication is successful (Yes in step S102→step S104). If it is determined that the login authentication is successful, the controller 11 shifts the processing to step S108 (Yes in step S104→step S108).

Meanwhile, if it is determined that the login authentication has failed, the controller 11 determines whether a part of authentication information input by the user includes a match or not (No in step S104→step S106). Here, it is assumed that the part of the authentication information including a match refers to a case where either the login user name (or the login user ID) or the password input by the user as the authentication information matches with either of the login user name and the password that satisfy the authentication requirements. Specifically, a situation in which the login user name input by the user matches with the login user name that satisfies the authentication requirements but the input password fails to match with the password that satisfies the authentication requirements, or a situation in which the password input by the user matches with the password that satisfies the authentication requirements but the input login user name fails to match with the login user name that satisfies the authentication requirements corresponds to the above case. It is also possible to adopt an operation in which a part of the authentication information input by the user is determined as including a match on condition that the authenticity of the user attempting to log into the multifunction peripheral 30 can be at least partially ensured (for example, when each of the login user name and the password that have been input partially matches with the login user name or the password satisfying the authentication requirements).

If it is determined that no match is acknowledged in a part of the authentication information input by the user, in other words, the login user name and the password input by the user as the authentication information both fail to match with the login user name and the password that satisfy the authentication requirements, the controller 11 determines that an unauthorized login operation has been performed. In this case, the controller 11 decides that a notification according to notification type 1 is applicable, and displays a message pertaining to the notification type 1 on the display 13 (No in step S106→step S16). Then, the controller 11 performs processing related to step S18 to step S26, and shifts the processing to step S108.

Meanwhile, if it is determined that a part of the authentication information input by the user includes a match, in other words, either the login user name or the password input by the user as the authentication information matches with either of the login user name and the password that satisfy the authentication requirements, the controller 11 decides that a notification according to notification type 2 is applicable, and displays a message pertaining to the notification type 2 on the display 13 (Yes in step S106→step S28). Then, the controller 11 performs processing, which is from step S30 to step S26, and shifts the processing to step S108.

Next, the controller 11 determines whether a job related to copying, faxing, scanning, or e-mailing has been executed (step S108). If the controller 11 determines that the job has been executed, the controller 11 determines whether the executed job corresponds to a job for which connection to an external network is required (Yes in step S108→step S110). Meanwhile, if it is determined that the job has not been executed, the controller 11 shifts the processing to step S112 (No in step S108→step S112).

If the controller 11 determines that the executed job corresponds to a job for which connection to the external network is required, the controller 11 decides that a notification according to notification type 1 is applicable, and displays a message pertaining to the notification type 1 on the display 13 (Yes in step S110→step S16). Then, the controller 11 performs processing related to step S18 to step S26, and shifts the processing to step S112.

Here, jobs for which connection to an external network is required include, for example, jobs related to sending and receiving faxes via a public switched telephone network as the external network, and jobs related to sending and receiving e-mails via the Internet as the external network. In these jobs, connection to the external network is essential in order to accomplish the job, and such jobs are at a higher risk for virus infection and device takeover as compared to jobs accomplished by the multifunction peripheral 30 alone (i.e., jobs for which connection to the external network is not required). As the administrator is made aware of the fact that such a job that requires connection to the external network has been executed, when the multifunction peripheral 30 is infected with a virus, for example, the job which has become the cause of the virus infection can be easily identified. As a result, it is possible give alerts to general users who use the multifunction peripheral 30, and expedite the initial response for countermeasures against the infection so that the spread of damage from the virus infection can be kept to a minimum.

Meanwhile, if it is determined that the executed job does not correspond to a job for which connection to the external network is required, the controller 11 decides that a notification according to notification type 2 is applicable, and displays a message pertaining to the notification type 2 on the display 13 (No in step S110→step S28). Then, the controller 11 performs processing, which is from step S30 to step S26, and shifts the processing to step S112.

Next, the controller 11 determines whether a device error has occurred (step S112). If the controller 11 determines that a device error has occurred, the controller 11 determines whether the occurred device error corresponds to a first error (Yes in step S112→step S114). Meanwhile, if it is determined that no device error has occurred, the controller 11 determines that the operation detected in step S100 corresponds to any other operation which is different from the login operation, the job execution, and the device error, and ends the processing (No in step S112→step S116).

If the controller 11 determines that the occurred device error corresponds to the first error, the controller 11 decides that a notification according to notification type 1 is applicable, and displays a message pertaining to the notification type 1 on the display 13 (Yes in step S114→step S16). Then, the controller 11 performs processing related to step S18 to step S26, and ends the processing.

Here, the first error includes, for example, an error which must be dealt with by a serviceman who take action such as part replacement or repair. That is, errors which cannot be dealt with by the general users who use the multifunction peripheral 30, for example, correspond to this error. When the first error occurs, the administrator must take action for recovery from the first error by, for example, promptly contacting a manufacturer or a sales representative and making a request to dispatch a serviceman. As the administrator is made aware of the fact that the first error has occurred, a time lag between the occurrence of the first error and the handling of the repair of the multifunction peripheral 30 can be eliminated, and a decrease in productivity due to the repair of the multifunction peripheral 30 can be reduced.

Meanwhile, if it is determined that the occurred device error does not correspond to the first error, the controller 11 decides that a notification according to notification type 2 is applicable, and displays a message pertaining to the notification type 2 on the display 13 (No in step S114→step S28). Then, the controller 11 performs processing, which is from step S30 to step S26, and ends the processing. As an error other than the first error (i.e., a second error), errors that can be dealt with even by general users such as replacement or replenishment of consumables in a situation where paper has run out or toner resupply is needed, for example, correspond to the above error.

Incidentally, in FIGS. 12 and 13, a detection/determination process for the login operation, the job execution, and the device error has been described as a consecutive process. However, each of the detection/determination processes can also be executed as an independent process, such as a detection/determination process for the login operation, a detection/determination process for the job execution, and a detection/determination process for the device error, for example.

Also, in step S16 or step S28 of FIG. 13, the message to be displayed on the display 13 (a system information screen W10, etc.) according to each notification type may be omitted, and the notification information according to each notification type may be directly displayed on the display 13 after a decision on the notification type has been made.

2.3 Operation Examples

Next, an operation example according to the second embodiment will be described. Parts that are the same as the configuration described with reference to FIGS. 6, 10, etc., of the first embodiment may be denoted by the same reference numerals, and descriptions of such parts may be omitted.

Figure 14:
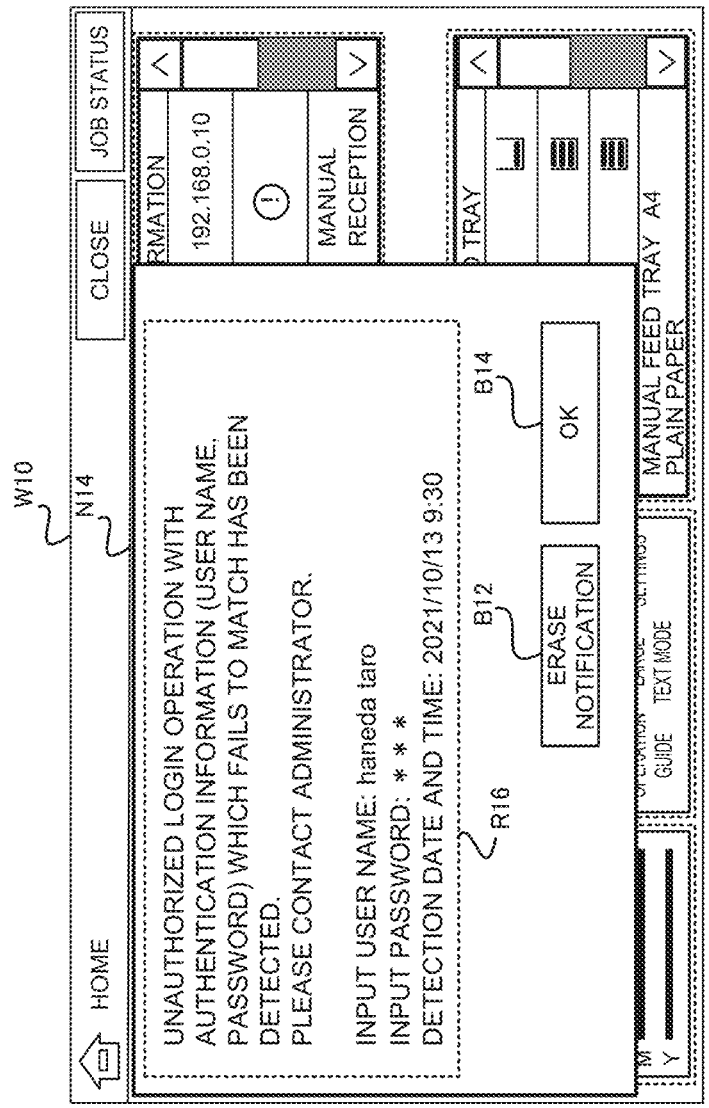
FIG. 14 is a diagram illustrating an operation example according to the second embodiment.

FIG. 14 is a diagram illustrating a configuration example of a notification information screen N14 according to the second embodiment. The present operation example corresponds to the processing executed from when step S106 of FIG. 12 is "No" to step S18 of FIG. 13. As is the case with the example illustrated in FIG. 6, the controller 11 can display the notification information screen N14 on the system information screen W10 in a superimposed manner.

The notification information screen N14 includes a notification information display area R16, an Erase Notification button B12, and an OK button B14.

The notification information display area R16 is a display area for displaying notification information when the content of operation that has been detected is a login operation, and the login user name and the password input by the user as the authentication information both fail to match with the login user name and the password that satisfy the authentication requirements. FIG. 14 illustrates an example in which, in addition to the contents "Unauthorized login operation with authentication information (user name, password) which fails to match has been detected. Please contact administrator." as the notification information, the following are displayed: input user name "haneda taro", input password "***", and detection date and time "2021/10/13 9:30".

Figure 15:
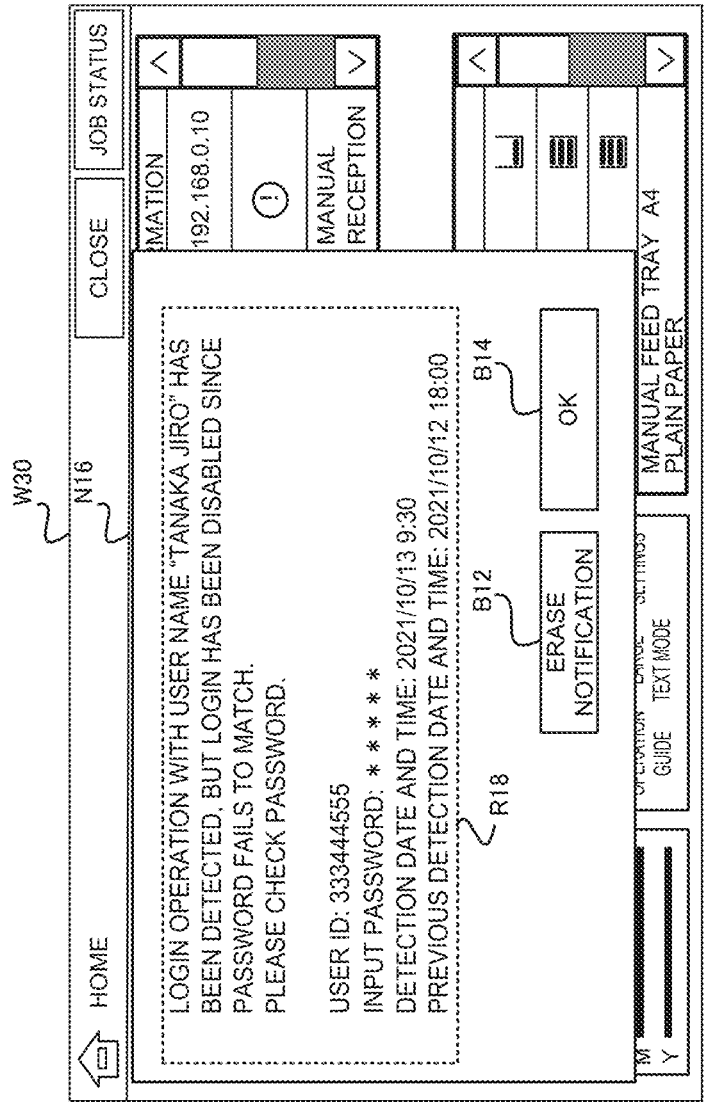
FIG. 15 is a diagram illustrating an operation example according to the second embodiment.

FIG. 15 is a diagram illustrating a configuration example of a notification information screen N16 according to the second embodiment. The present operation example corresponds to the processing executed from when step S106 of FIG. 12 is "Yes" to step S30 of FIG. 13. As is the case with the example illustrated in FIG. 10, the controller 11 can display the notification information screen N16 on a system information screen W30 in a superimposed manner.

The notification information screen N16 includes a notification information display area R18, the Erase Notification button B12, and the OK button B14.

The notification information display area R18 is a display area for displaying notification information when the content of operation that has been detected is a login operation, and either the login user name or the password input by the user as the authentication information matches with either of the login user name and the password that satisfy the authentication requirements. FIG. 15 illustrates an example in which, in addition to the contents "Login operation with user name "tanaka jiro" has been detected, but login has been disabled since password fails to match. Please check password." as the notification information, the following are displayed: user ID "333444555", input password "*****", detection date and time "2021/10/13 9:30", and previous detection date and time "2021/10/12 18:00".

Figure 16:
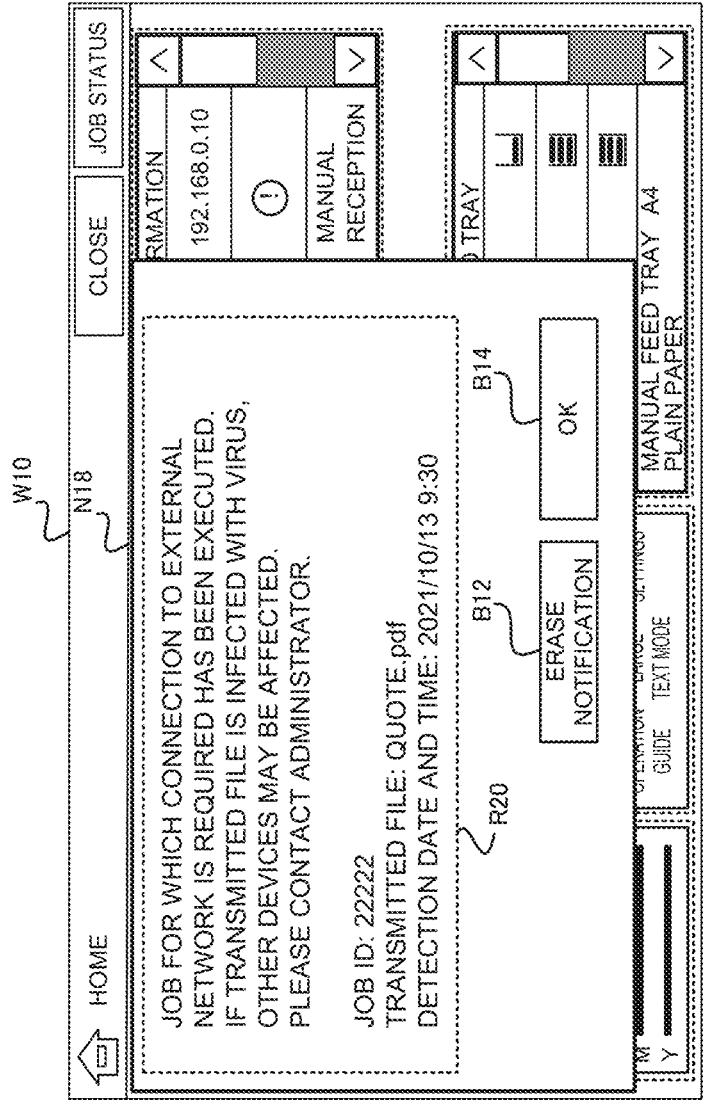
FIG. 16 is a diagram illustrating an operation example according to the second embodiment.

FIG. 16 is a diagram illustrating a configuration example of a notification information screen N18 according to the second embodiment. The present operation example corresponds to the processing executed from when step S110 of FIG. 12 is "Yes" to step S18 of FIG. 13. As is the case with the example illustrated in FIG. 6, the controller 11 can display the notification information screen N18 on the system information screen W10 in a superimposed manner.

The notification information screen N18 includes a notification information display area R20, the Erase Notification button B12, and the OK button B14.

The notification information display area R20 is a display area for displaying notification information when the content of operation that has been detected is job execution, and the executed job corresponds to a job for which connection to an external network is required. FIG. 16 illustrates an example in which, in addition to the contents "Job for which connection to external network is required has been executed. If transmitted file is infected with virus, other devices may be affected. Please contact administrator." as the notification information, the following are displayed: job ID "22222", transmitted file "Quote.pdf", and detection date and time "2021/10/13 9:30".

Figure 17:
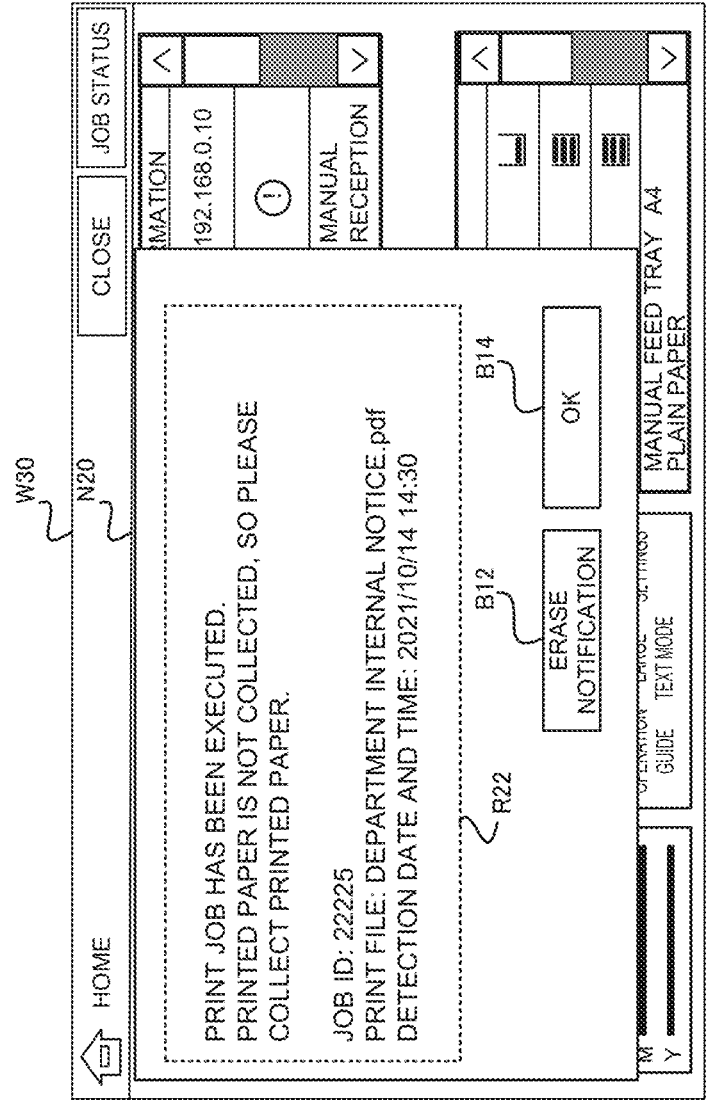
FIG. 17 is a diagram illustrating an operation example according to the second embodiment.

FIG. 17 is a diagram illustrating a configuration example of a notification information screen N20 according to the second embodiment. The present operation example corresponds to the processing executed from when step S110 of FIG. 12 is "No" to step S30 of FIG. 13. As is the case with the example illustrated in FIG. 10, the controller 11 can display the notification information screen N20 on the system information screen W30 in a superimposed manner.

The notification information screen N20 includes a notification information display area R22, the Erase Notification button B12, and the OK button B14.

The notification information display area R22 is a display area for displaying notification information when the content of operation that has been detected is job execution, and the executed job does not correspond to a job for which connection to an external network is required. FIG. 17 illustrates an example in which, in addition to the contents "Print job has been executed. Printed paper is not collected, so please collect printed paper." as the notification information, the following are displayed: job ID "22225", print file "Department Internal Notice.pdf", and detection date and time "2021/10/14 14:30".

Figure 18:
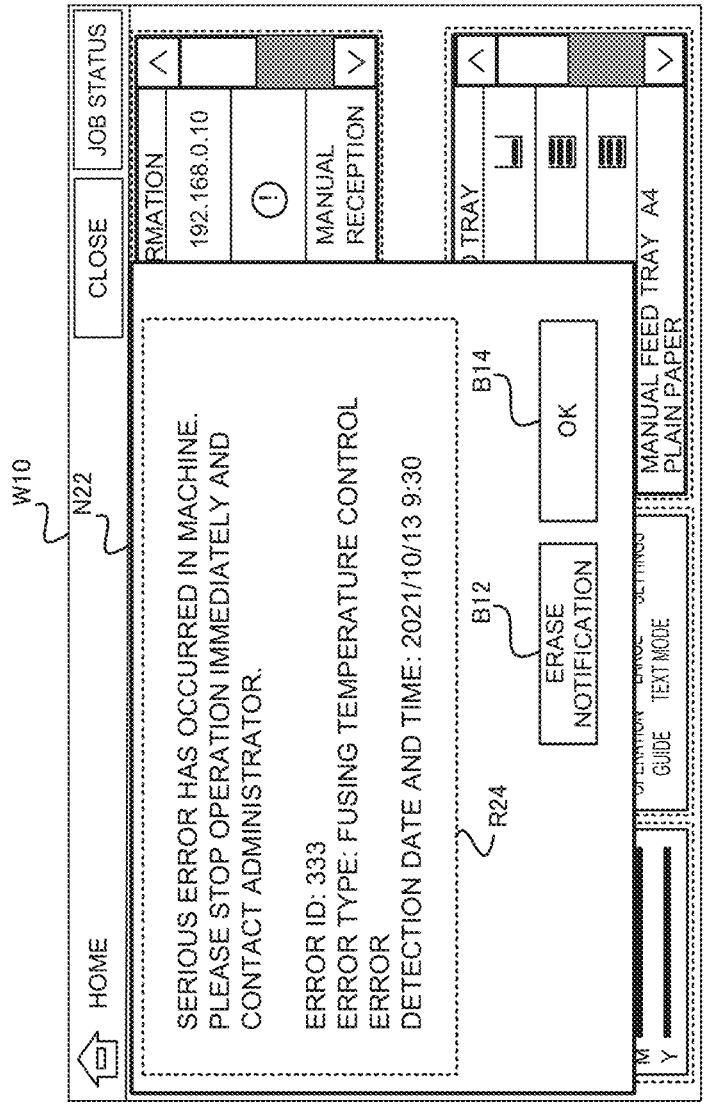
FIG. 18 is a diagram illustrating an operation example according to the second embodiment.

FIG. 18 is a diagram illustrating a configuration example of a notification information screen N22 according to the second embodiment. The present operation example corresponds to the processing executed from when step S114 of FIG. 12 is "Yes" to step S18 of FIG. 13. As is the case with the example illustrated in FIG. 6, the controller 11 can display the notification information screen N22 on the system information screen W10 in a superimposed manner.

The notification information screen N22 includes a notification information display area R24, the Erase Notification button B12, and the OK button B14.

The notification information display area R24 is a display area for displaying notification information when an event that has been detected is a device error, and the device error corresponds to the first error. FIG. 18 illustrates an example in which, in addition to the contents "Serious error has occurred in machine. Please stop operation immediately and contact administrator." as the notification information, the following are displayed: error ID"333", error type "fusing temperature control error", and detection date and time "2021/10/13 9:30".

Figure 19:
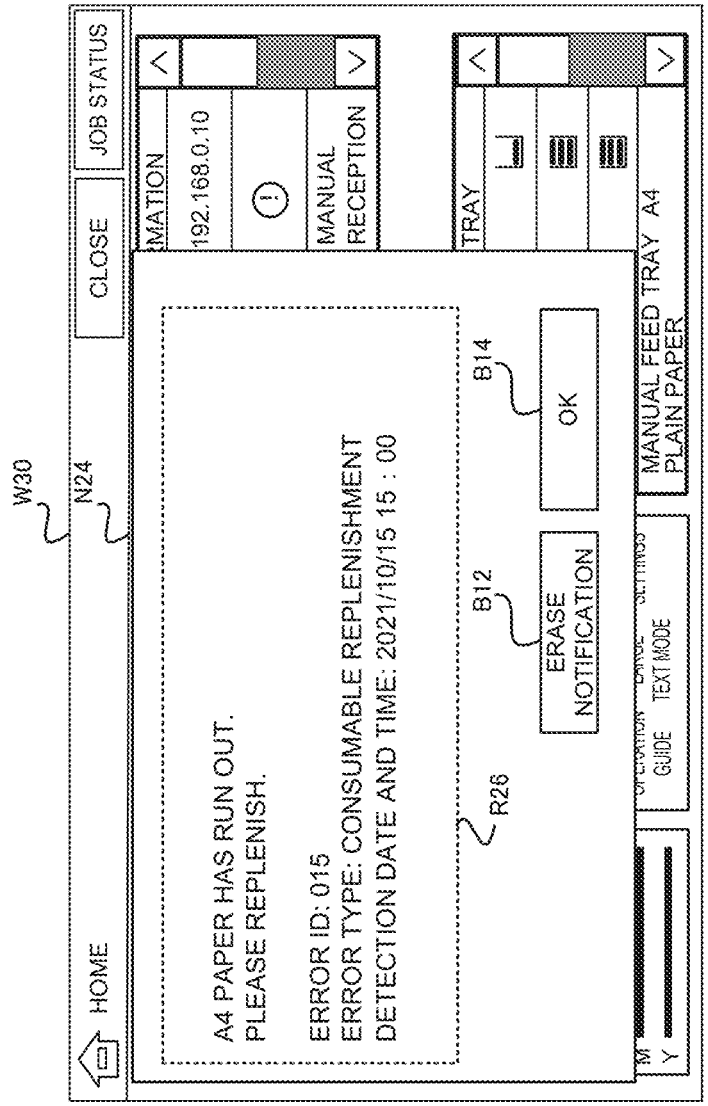
FIG. 19 is a diagram illustrating an operation example according to the second embodiment.

FIG. 19 is a diagram illustrating a configuration example of a notification information screen N24 according to the second embodiment. The present operation example corresponds to the processing executed from when step S114 of FIG. 12 is "No" to step S30 of FIG. 13. As is the case with the example illustrated in FIG. 10, the controller 11 can display the notification information screen N24 on the system information screen W30 in a superimposed manner.

The notification information screen N24 includes a notification information display area R26, the Erase Notification button B12, and the OK button B14.

The notification information display area R26 is a display area for displaying notification information when an event that has been detected is a device error, and the device error does not correspond to the first error. FIG. 19 illustrates an example in which, in addition to the contents "A4 paper has run out. Please replenish." as the notification information, the following are displayed: error ID "015", error type "consumable replenishment", and detection date and time "2021/10/15 15:00".

As described above, according to the second embodiment, it is possible to monitor a device condition of a multifunction peripheral, and restrict, according to an operation performed by a user on the multifunction peripheral or an event which has occurred, operation authority over notification information displayed on a display to a specific user or make the operation authority unrestricted. By this feature, it is possible to provide an image processing apparatus and the like which can certainly notify an administrator of notification information which should be checked and acted upon by the administrator according to the device condition of the multifunction peripheral.

3 Third Embodiment

A third embodiment represents an embodiment in which a virus quarantine function exemplified in the first embodiment is provided for the second embodiment (i.e., detection of a job for which connection to an external network is required).

A functional configuration of a multifunction peripheral according to the third embodiment can be realized by implementing an anti-virus program 2341 to the event detection program 334 of the multifunction peripheral 30 described in the second embodiment. Since the configuration other than the above can be made the same as the configuration of the multifunction peripheral 30 according to the second embodiment, description thereof will not be provided here.

3.1 Flow of Processing

Figure 20:
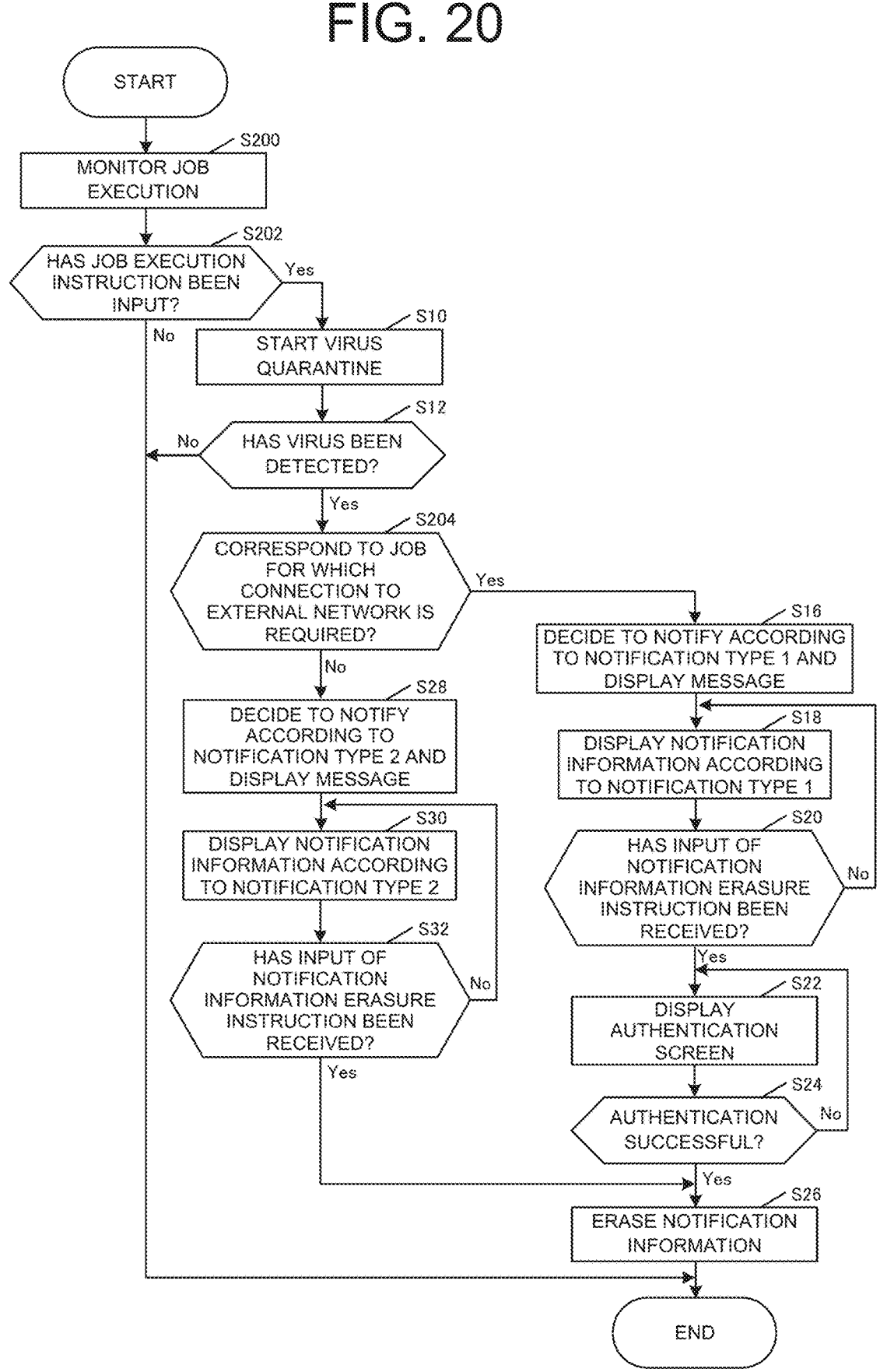
FIG. 20 is a flowchart illustrating a flow of processing according to a third embodiment.

Next, a flow of processing according to the third embodiment will be described. FIG. 20 is a flowchart illustrating a flow of processing according to the third embodiment. Parts that can be made the same as the processing described with reference to FIGS. 12 and 13 of the second embodiment may be denoted by the same step numbers, and descriptions of such parts may be omitted.

First, a controller 11 starts monitoring of a job executed by a multifunction peripheral (step S200). After starting the monitoring of the job, the controller 11 determines whether input of a job execution instruction has been received (step S202).

If it is determined that input of a job execution instruction has been received, the controller 11 starts virus quarantine (Yes in step S202→step S10). Then, the controller 11 determines whether a virus has been detected (step S12). Meanwhile, if it is determined that no input of a job execution instruction has been received, the controller 11 ends the processing (No in step S202→End).

If the controller 11 determines that a virus has been detected, the controller 11 determines whether the job for which input of execution instruction has been received corresponds to a job for which connection to an external network is required (Yes in step S12→step S204). Meanwhile, if it is determined that no virus has been detected, the controller 11 ends the processing (No in step S12→End).

If the controller 11 determines that the job for which input of execution instruction has been received corresponds to a job for which connection to the external network is required, the controller 11 decides that a notification according to notification type 1 is applicable, and displays a message pertaining to the notification type 1 on a display 13 (Yes in step S204→step S16). Then, the controller 11 performs processing related to step S18 to step S26, and ends the processing.

Meanwhile, if it is determined that the job for which input of execution instruction has been received does not correspond to a job for which connection to the external network is required, the controller 11 decides that a notification according to notification type 2 is applicable, and displays a message pertaining to the notification type 2 on the display 13 (No in step S204→step S28). Then, the controller 11 performs processing, which is from step S30 to step S26, and ends the processing.

3.2 Operation Examples

Next, an operation example according to the third embodiment will be described. Parts that are the same as the configuration described with reference to FIGS. 6, 10, etc., of the first embodiment may be denoted by the same reference numerals, and descriptions of such parts may be omitted.

Figure 21:
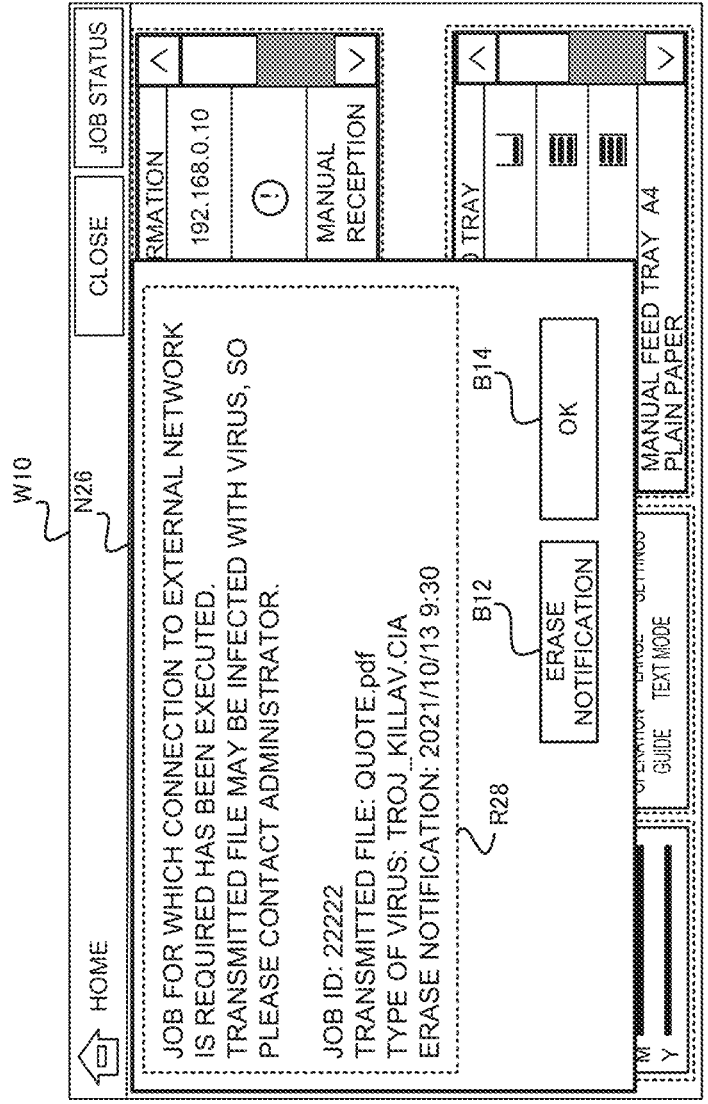
FIG. 21 is a diagram illustrating an operation example according to the third embodiment.

FIG. 21 is a diagram illustrating a configuration example of a notification information screen N26 according to the third embodiment. The present operation example corresponds to the processing in a flow of "Yes" in step S12, "Yes" in step S204, step S16, and step S18 of FIG. 20. As is the case with the example illustrated in FIG. 6, the controller 11 can display the notification information screen N26 on a system information screen W10 in a superimposed manner.

The notification information screen N26 includes a notification information display area R28, an Erase Notification button B12, and an OK button B14.

The notification information display area R28 is a display area for displaying notification information when a virus has been detected, and a job for which execution instruction has been received from a user corresponds to a job for which connection to an external network is required. FIG. 21 illustrates an example in which, in addition to the contents "Job for which connection to external network is required has been executed. Transmitted file may be infected with virus, so please contact administrator." as the notification information, the following are displayed: job ID "22222", transmitted file "Quote.pdf", type of virus "TROJ_KILLAV-.CIA", and detection date and time "2021/10/13 9:30".

Figure 22:
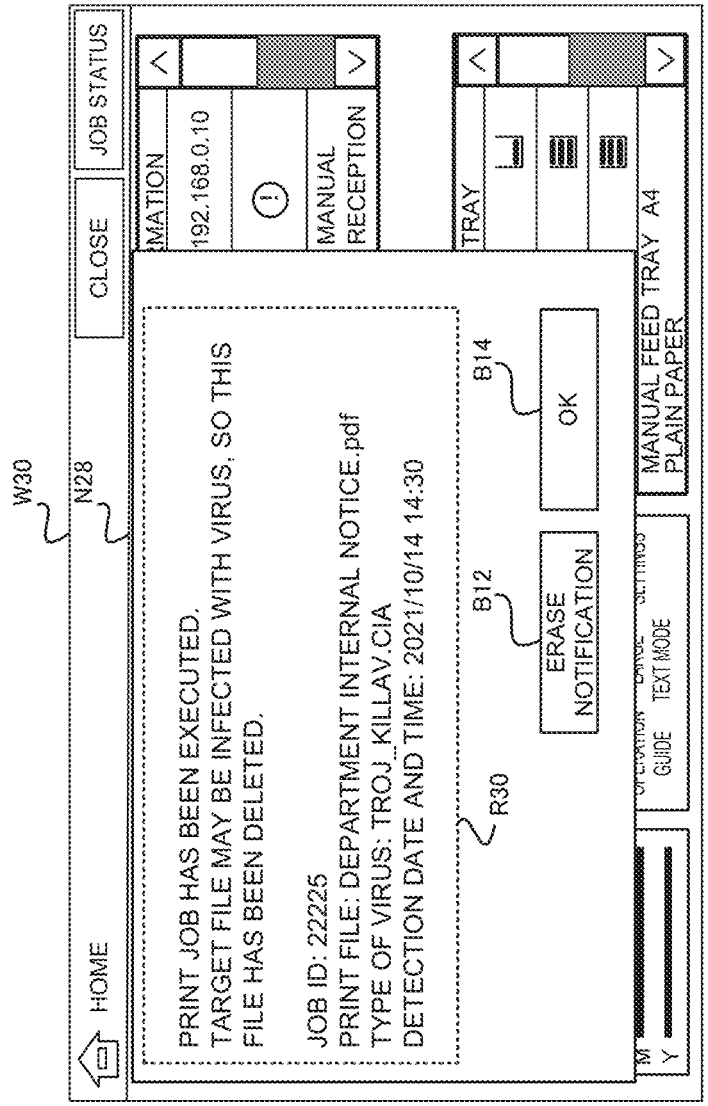
FIG. 22 is a diagram illustrating an operation example according to the third embodiment.

FIG. 22 is a diagram illustrating a configuration example of a notification information screen N28 according to the third embodiment. The present operation example corresponds to the processing in a flow of "Yes" in step S12, "No" in step S204, step S28, and step S30 of FIG. 20. As is the case with the example illustrated in FIG. 10, the controller 11 can display the notification information screen N28 on a system information screen W30 in a superimposed manner.

The notification information screen N28 includes a notification information display area R30, the Erase Notification button B12, and the OK button B14.

The notification information display area R30 is a display area for displaying notification information when a virus has been detected, and a job for which execution instruction has been received from the user does not correspond to a job for which connection to an external network is required. FIG. 22 illustrates an example in which, in addition to the contents "Print job has been executed. Target file may be infected with virus, so this file has been deleted." as the notification information, the following are displayed: job ID "22225", print file "Department Internal Notice.pdf", type of virus "TROJ_KILLAV.CIA", and detection date and time "2021/10/14 14:30".

As described above, according to the third embodiment, advantages in addition to those of the second embodiment can be obtained. That is, since the administrator can immediately be aware of virus infection on a file of the executed job and the possibility of whether the virus-infected file has been transmitted to the outside, it is possible give alerts to general users who use the multifunction peripheral 30, and expedite the initial response for countermeasures against the infection so that the spread of damage caused by the virus infection can be kept to a minimum.

The present disclosure is not limited to the above-described embodiments, and various changes can be made. That is, embodiments obtained by combining technical measures modified as appropriate within a range that does not depart from the gist of the present disclosure are also included in the technical scope of the present disclosure.

Further, although the above-described embodiments include some parts described separately for convenience of explanation, it is needless to say that the embodiments may be combined within a technically possible range and implemented.

In addition, the program to be operated on each of the devices in the embodiments is a program that controls the CPU or the like (i.e., a program which makes a computer function) so as to implement the functions of the above-described embodiments. The embodiments assume a device in which a plurality of programs are executed simultaneously as needed by multitask processing. The information handled by the devices is temporarily accumulated in a temporary storage device (for example, a RAM) during processing of the information, and then, is stored in various storage devices such as a read-only memory (ROM) and an HDD, and is read, modified, and written by the CPU as necessary.

A recording medium used for storing the program may be any one of a semiconductor medium (for example, a ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray (registered trademark) disc (BD), or the like), and a magnetic recording medium (for example, a magnetic tape, a flexible disk, or the like). Moreover, not only are the functions of the embodiments described above implemented by execution of a loaded program, but the functions of the present disclosure may also be implemented by processing performed in cooperation with an operating system or other application programs, etc., on the basis of an instruction of the program.

Furthermore, when the program is to be distributed to the market, the program may be stored in a portable recording medium for distribution or transferred to a server computer connected via a network such as the Internet. In this case, a storage device of the server computer is also included in the present disclosure as a matter of course.

What is claimed is:

1. An image processing apparatus comprising:
a display which displays notification information regarding an occurred event;
a memory which stores one or more computer-readable instructions; and
one or more controllers, wherein
the one or more controllers, by executing the one or more computer-readable instructions,
detect the occurrence of the event,
determine whether the notification information regarding the detected event corresponds to notification information that requires a notification to a specific user,
display, on the display, notification information that includes a prompt to contact the specific user when the notification information regarding the detected event corresponds to the notification information that requires the notification to the specific user,
display, on the display, notification information that includes no prompt to contact the specific user when the notification information regarding the detected event does not correspond to the notification information that requires the notification to the specific user,
restrict, when the event corresponds to a virus infection of device information that is operable only by the specific user, an operation authority over the notification information that includes the prompt to contact the specific user to the specific user, and
make, when the event corresponds to a virus infection of input/output information for the image processing apparatus, the operation authority over the notification information that includes no prompt to contact the specific user unrestricted.

2. The image processing apparatus according to claim 1, wherein
the operation authority is an operation authority regarding an instruction to erase the notification information on the display.

3. The image processing apparatus according to claim 2, wherein the one or more controllers, by executing the one or more computer-readable instructions, further receive the instruction to erase the notification information by a user selection of an erase button that is displayed with the notification information.

4. The image processing apparatus according to claim 1, wherein
the one or more controllers, by executing the one or more computer-readable instructions, further authenticate the specific user and request authentication of the specific user when an operation for the notification information that includes the prompt to contact the specific user is to be approved.

5. The image processing apparatus according to claim 1, wherein the one or more controllers, by executing the one or more computer-readable instructions, further erase the notification information, that includes a prompt to contact the specific user, subject to a successful authentication of the specific user when an instruction to erase the notification information that is the notification for the specific user is received, and the one or more controllers further erase the notification information, that includes the no prompt to contact the specific user, based on the instruction to erase the notification information when the instruction to erase the notification information that is not the notification for the specific user is received.

6. An image processing apparatus comprising:
a display which displays notification information regarding an occurred event;
a memory which stores one or more computer-readable instructions; and
one or more controllers, wherein
the occurred event is any one of a login operation to the image processing apparatus, an execution of a job, and an occurrence of a device error,
the one or more controllers, by executing the one or more computer-readable instructions,
detect the occurrence of the event,
determine whether the notification information regarding the detected event corresponds to notification information that requires a notification to a specific user,
display, on the display, notification information that includes a prompt to contact the specific user when the notification information regarding the detected event corresponds to the notification information that requires the notification to the specific user,
display, on the display, notification information that includes no prompt to contact the specific user when the notification information regarding the detected event does not correspond to the notification information that requires the notification to the specific user, and
when a virus is detected as a result of a virus quarantine:
restrict an operation authority over the notification information that includes a prompt to contact the specific user to the specific user if the event corresponds to the execution of a job for which a connection to an external network is necessary, and
make the operation authority over the notification information that includes the no prompt to contact the specific user unrestricted if the event corresponds to the execution of a job for which the connection to the external network is unnecessary.

7. A method of controlling an image processing apparatus, the method comprising:
- detecting an occurrence of an event;
- displaying notification information regarding the occurred event on a display;
- determining whether the notification information regarding the detected event corresponds to notification information that requires a notification to a specific user;
- displaying, on the display, notification information that includes a prompt to contact the specific user when the notification information regarding the detected event corresponds to the notification information that requires the notification to the specific user;
- displaying, on the display, notification information that includes no prompt to contact the specific user when the notification information regarding the detected event does not correspond to the notification information that requires the notification to the specific user;
- restricting, when the event corresponds to a virus infection of device information that is operable only by the specific user, an operation authority over the notification information that includes the prompt to contact the specific user to the specific user; and
- making, when the event corresponds to a virus infection of input/output information for the image processing apparatus, the operation authority over the notification information that includes no prompt to contact the specific user-unrestricted.

* * * * *